(12) United States Patent
Berz

(10) Patent No.: US 10,386,174 B2
(45) Date of Patent: Aug. 20, 2019

(54) THREE-DIMENSIONAL INTERFEROMETER, METHOD FOR CALIBRATING SUCH AN INTERFEROMETER AND METHOD FOR RECONSTRUCTING AN IMAGE

(71) Applicant: Martin Berz, Munich (DE)

(72) Inventor: Martin Berz, Munich (DE)

( * ) Notice: Subject to any disclaimer, the term of this patent is extended or adjusted under 35 U.S.C. 154(b) by 110 days.

(21) Appl. No.: 15/505,420

(22) PCT Filed: Aug. 19, 2015

(86) PCT No.: PCT/EP2015/069089
§ 371 (c)(1),
(2) Date: Feb. 21, 2017

(87) PCT Pub. No.: WO2016/026909
PCT Pub. Date: Feb. 25, 2016

(65) Prior Publication Data
US 2017/0268866 A1    Sep. 21, 2017

(30) Foreign Application Priority Data

Aug. 21, 2014   (DE) ..................... 10 2014 111 979

(51) Int. Cl.
 *G01B 9/02* (2006.01)
 *G01J 3/45* (2006.01)
 (Continued)

(52) U.S. Cl.
 CPC ..... *G01B 9/02072* (2013.04); *G01B 9/02097* (2013.01); *G01B 11/2441* (2013.01);
 (Continued)

(58) Field of Classification Search
 CPC ............ G01B 9/02072; G01B 9/02097; G01B 11/2441; G01J 3/45; G01J 3/453; G01J 9/02
 See application file for complete search history.

(56) References Cited

U.S. PATENT DOCUMENTS 3,586,416 A * 6/1971 De Bitetto ............... G02F 1/21
                                                      356/491
4,422,764 A * 12/1983 Eastman ............ G01B 11/303
                                                      356/512
(Continued)

FOREIGN PATENT DOCUMENTS

CN         101957238 A      1/2011
CN         103712689 A      4/2014
(Continued)

OTHER PUBLICATIONS

International Search Report dated Nov. 19, 2015 for corresponding foreign Application No. PCT/EP2015/069089, 2 pp.
(Continued)

*Primary Examiner* — Michael A Lyons
(74) *Attorney, Agent, or Firm* — United IP Counselors, LLC

(57) ABSTRACT

An interferometer includes a first interferometer arm and a second interferometer arm. A first central beam, originating from a central image point of an image, passes through the first interferometer arm. A second central beam, originating from the central image point, passes through the second interferometer arm. The first central beam and the second central beam are superimposed and generate a $k_{perpendicular}=0$ interference at a superposition point. A first light beam perpendicular to the first central beam, originating from an image point of the image, passes through the first interferometer arm. A second light beam perpendicular to the second central beam, originating from the image point, passes through the second interferometer arm. The first light beam and the second light beam overlap at the superposition point. At the superposition point, a wave vector component of the first light beam opposes a wave vector component of the second light beam.

17 Claims, 9 Drawing Sheets

(51) Int. Cl.
*G01J 9/02* (2006.01)
*G01B 11/24* (2006.01)
*G01J 3/453* (2006.01)

(52) U.S. Cl.
CPC ............... *G01J 3/45* (2013.01); *G01J 3/453* (2013.01); *G01J 9/02* (2013.01)

(56) References Cited

U.S. PATENT DOCUMENTS

| | | | |
|---|---|---|---|
| 5,883,717 A * | 3/1999 | DiMarzio | G01J 3/447 |
| | | | 356/491 |
| 7,154,608 B1 | 12/2006 | Glassman | |
| 7,499,174 B2 | 3/2009 | Farah | |
| 7,720,526 B1 * | 5/2010 | Modell | A61B 5/0066 |
| | | | 356/407 |
| 8,693,001 B2 | 4/2014 | Farah | |
| 9,273,949 B2 * | 3/2016 | Bornhop | G01B 9/02041 |
| 2006/0119861 A1 * | 6/2006 | Saunders | G01B 11/2441 |
| | | | 356/512 |
| 2006/0154156 A1 | 7/2006 | Farah | |
| 2006/0268408 A1 | 11/2006 | Toussaint, Jr. et al. | |
| 2010/0231922 A1 | 9/2010 | Hess et al. | |
| 2013/0222814 A1 | 8/2013 | Farah | |

FOREIGN PATENT DOCUMENTS

| | | |
|---|---|---|
| DE | 102013101856.4 A1 | 9/2014 |
| DE | 102014111979.7 A1 | 2/2016 |

OTHER PUBLICATIONS

Marks et al.; Visible Cone-Beam Tomography With a Lensless Interferometric Camera; Science vol. 284, 2164, Jun. 25, 1999.
Office Action issued in Chinese Patent Application No. 201580043188.0 dated Nov. 24, 2017 with English Translation.
Office Action issued in Japanese Patent Application No. 2017-527978 dated Nov. 22, 2016 with English Translation.

* cited by examiner

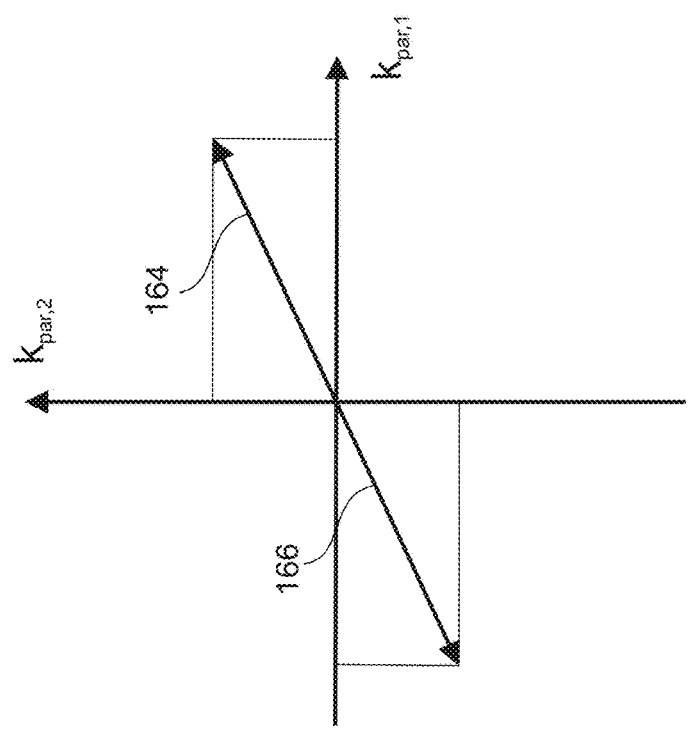
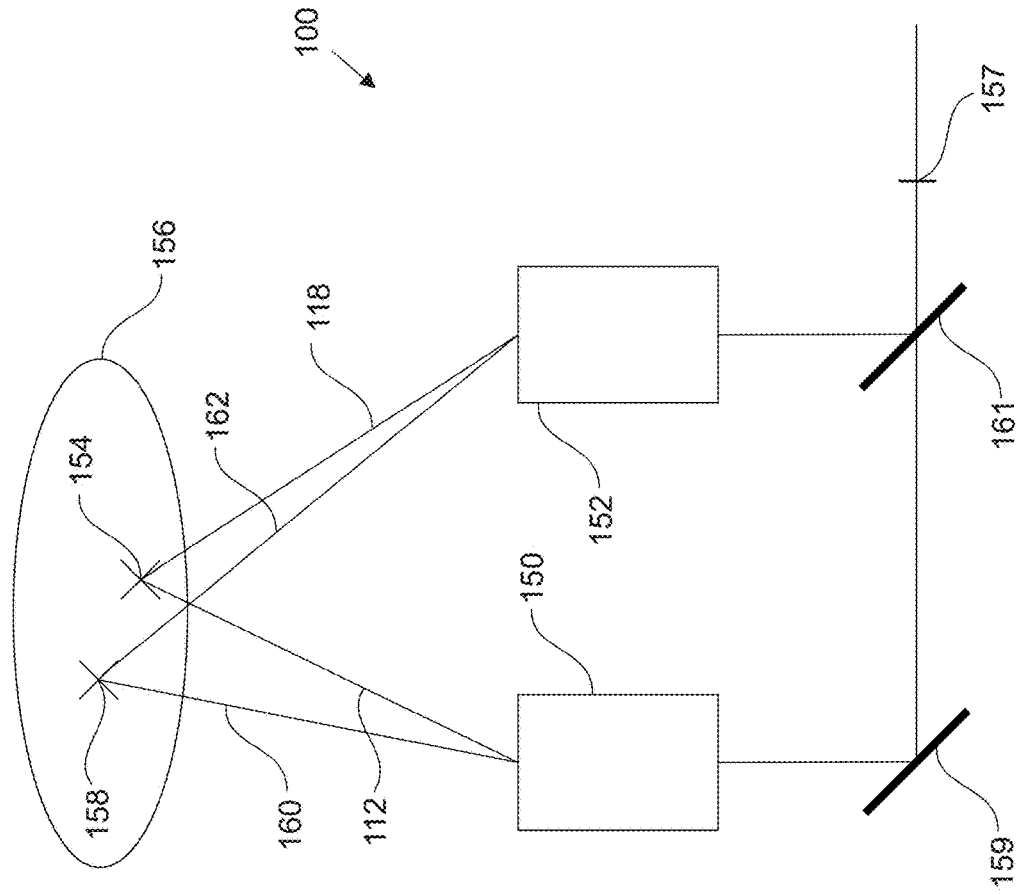

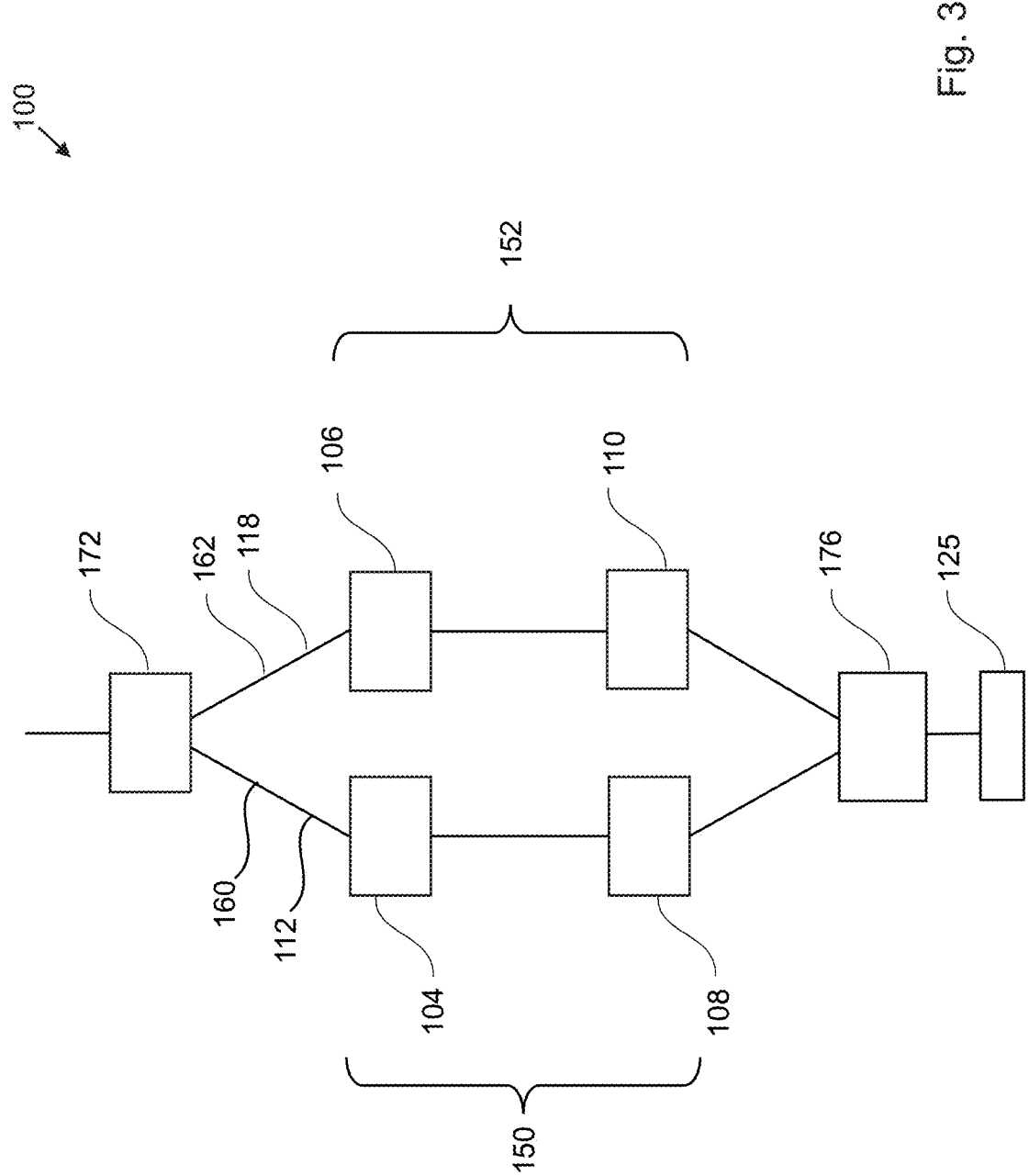

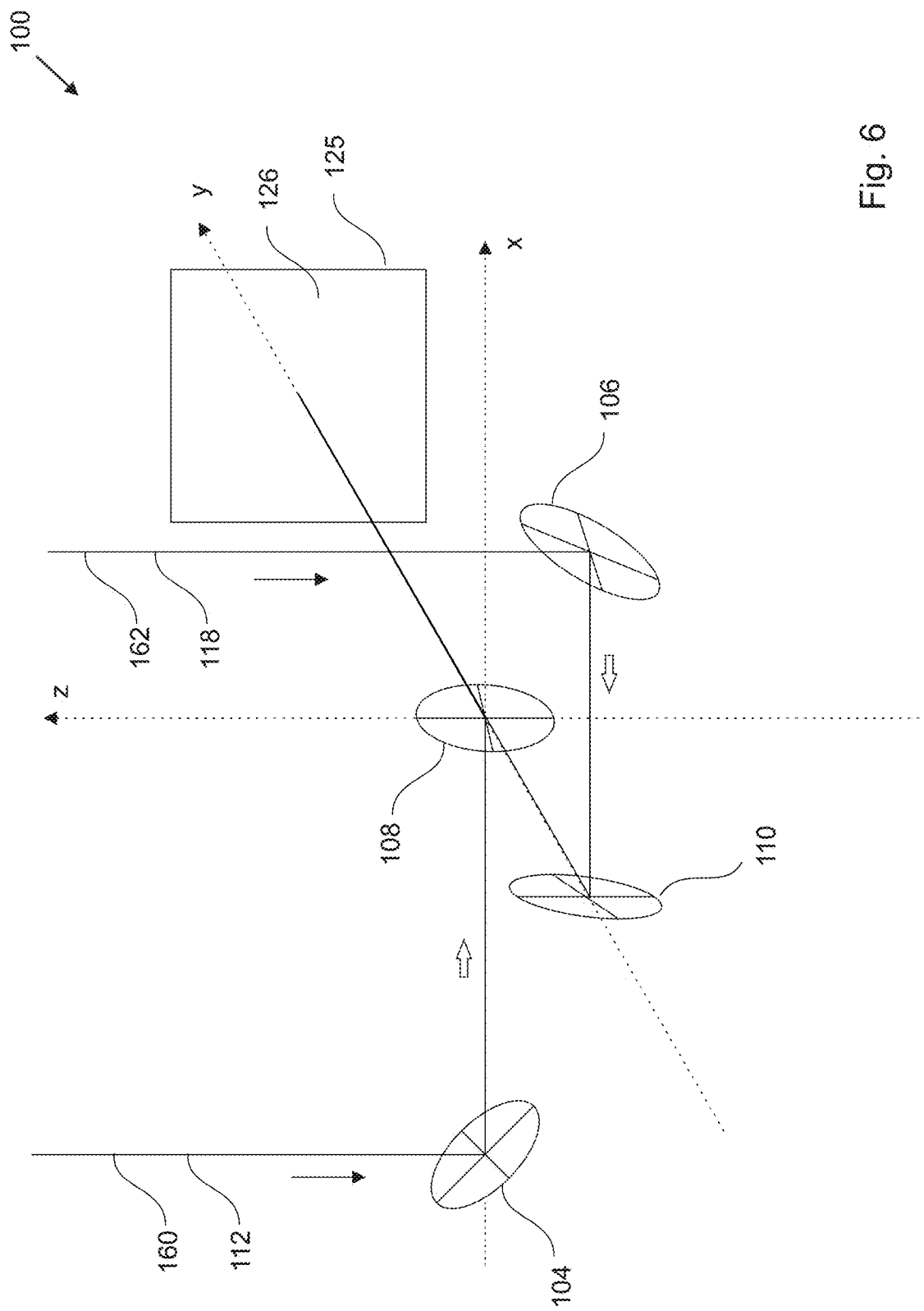

THREE-DIMENSIONAL INTERFEROMETER, METHOD FOR CALIBRATING SUCH AN INTERFEROMETER AND METHOD FOR RECONSTRUCTING AN IMAGE

CROSS-REFERENCE TO RELATED APPLICATIONS

This application is the U.S. National Phase of PCT International Application No. PCT/EP2015/069089, filed on Aug. 19, 2015. That application claims priority to German Patent Application No. 102014111979.7, filed Aug. 21, 2014. The contents of both applications are herein incorporated by reference in their entirety.

BACKGROUND

Technical Field

The invention relates to an interferometer and to methods carried out using this interferometer.

Background Art

The interferometer here is an interferometer which enables an interferometric determination of an angle of incidence of a beam emitted from an image point of an original image to be measured. The angle of incidence may be measured here between an axis defined by the construction and a straight line which runs through a reference point, defined by the construction, and an image point of the original image to be measured.

An interferometer will be understood here to mean any device, any construction or any structure which enables an interferometric measurement. It is not absolutely necessary that this device, this construction or this structure already carries out an interferometric measurement.

Known interferometers are, inter alia, the Michelson interferometer and the Mach-Zehnder interferometer. U.S. Pat. Nos. 8,693,001 B2 and 7,499,174 B2 disclose methods and devices for lensless imaging.

BRIEF SUMMARY

It is an object of the present invention to specify an interferometer of the aforementioned type which generates, in particular in a lensless manner, interference patterns for different image points of an original image to be measured, which interference patterns can be unambiguously assigned to these different image points of the original image to be measured.

Another object of the invention is to provide a device which makes it possible, at distances greater than 0.1 m, to resolve image points of the calculated original image on the basis of the interferogram generated by the interferometer, with a high resolution and better than optical standard systems.

The interferometer construction is intended to solve this problem by way of a simple set-up. Furthermore, the interferometer should be able to be produced inexpensively.

It is also an object of the invention to provide a method which reconstructs the original image in question from an image that has been imaged in a lensless manner from an original image.

Here, lensless imaging means in particular an imaging which takes place only by way of flat, in particular perfectly reflective, surfaces. In this case, the image has been generated in particular using an interferometer according to the invention.

Another object of the invention is to provide, in particular by using beam-expanding elements, a device which positionally resolves original image points in a lensless fashion, in particular at distances smaller than 10 cm, and thus can also be used in frequency ranges for which no dielectric lenses exist, particularly in deep UV.

The object of the invention is achieved by an interferometer, comprising: a first interferometer arm and a second interferometer arm, wherein the first interferometer arm and the second interferometer arm are arranged in such a way that a first central beam, originating from a central image point of an original image to be imaged, passes through the first interferometer arm, the second central beam, originating from the central image point of the original image to be imaged, passes through the second interferometer arm, wherein, after passing through the first or second interferometer arm, the first central beam and the second central beam are superimposed and generate a $k_{perpendicular}=0$ interference at a superposition point of the first central beam and the second central beam, a first light beam, originating from an image point of the original image to be imaged, passes through the first interferometer arm, and a second light beam, originating from an image point of the original image to be imaged, passes through the second interferometer arm, wherein, after passing through the first or second interferometer arm, the first light beam and the second light beam overlap at the superposition point of the first central beam and the second central beam, and wherein, at the superposition point, a wave vector component of the first light beam, which is perpendicular to the first central beam, and a wave vector component of the second light beam, which is perpendicular to the second central beam, are arranged in an opposing manner.

The known interferometers, such as for example the Michelson interferometer or the Mach-Zehnder interferometer, are usually constructed from elements which lie in one plane. In contrast thereto, the interferometer according to the present invention preferably has elements which do not lie in one plane, that is to say therefore have a three-dimensional arrangement.

The object to be imaged may have a three-dimensional structure.

In the present invention, the interferometric measurement is carried out by splitting the light emitted from the original image to be measured into the first and second interferometer arm, and then combining the light from the two interferometer arms at the superposition point, at which for example a detector may be arranged. In order to be able to measure an interference, the optical path length difference between the two interferometer arms must be less than the corresponding coherence length of the light that is used.

The optical path length will be understood to mean the integral of the refractive index along the distance travelled by the light. If the refractive index is constant along this path, the optical path length is identical to the product of the refractive index and the distance of the path travelled.

The interferometer set-up comprises two interferometer arms. The two central beams run through these two interferometer arms, that is to say the first central beam runs through the first interferometer arm and the second central beam runs through the second interferometer arm. The first central beam and the second central beam are superimposed after passing through the respective interferometer arm.

The expression that the two central beams are superimposed after passing through the first and second interferometer arm can be understood to mean that the directions of propagation of the two central beams are identical and the two central beams run through a common point, in the present case the superposition point.

The superimposing of the first central beam and of the second central beam results in a plurality of superposition points starting from the first point at which the first central beam and the second central beam are superimposed. For observing an interference, all of these superposition points are equivalent provided that the coherence condition is met, that is to say provided that, starting from the image point to be imaged, the difference of the two optical paths through the first and second interferometer arm is less than the coherence length of the light that is used.

The position of a central image point of an original image to be imaged can be defined, for example in the case of predefined interferometer arms, in such a way that the two central beams, after passing through the respective interferometer arms, generate a $k_{perpendicular}=0$ interference at a superposition point of the central beams.

For plane waves, a $k_{perpendicular}=0$ interference can be understood to mean an interference between two light beams in which the wave vectors of the two interfering light beams have the same direction, in particular are identical. A $k_{perpendicular}=0$ interference is thus an interference between two light beams in which a perpendicular wave vector component is missing and thus is equal to zero. If a detector having a flat detection surface detects this $k_{perpendicular}=0$ interference, and the wave vectors of the interfering light beams are perpendicular on the detection surface, each point on the entire detection surface has an identical intensity. The detection surface thus has no typical interference pattern in which the intensity typically varies in a sinusoidal manner. The $k_{perpendicular}=0$ interference is nevertheless an interference, since the intensity on the entire detection surface varies in a sinusoidal manner in the event of variation of the optical path of one of the two central beams.

For spherical waves, it can generally be stated that a $k_{perpendicular}=0$ interference can be understood to mean an interference in which the interfering beams have parallel wavefronts.

While the two central beams are superimposed at the superposition point, the two light beams which originate from one image point of the original image to be imaged and which run through the two interferometer arms are overlapped at the superposition point. This means that the directions of propagation of the first and second light beam are generally not identical. In practice, this usually means an overlapping of the beam profiles of the first and second light beam. If the difference of the respective optical paths is less than the coherence length, typical interference bands are seen in this case.

The fact that, at the superposition point, a wave vector component of the first light beam, which is perpendicular to the first central beam, and a wave vector component of the second light beam, which is perpendicular to the second central beam, are opposed can be regarded as a central finding of the present invention. Here, a wave vector component which is perpendicular to the first central beam is any component provided that the component is perpendicular to the first central beam. The wave vector component of the first light beam, which is perpendicular to the first central beam, is the total perpendicular wave vector component, so that the vector sum of the wave vector components of the first light beam which are perpendicular to the first central beam and of the wave vector components of the first light beam which are parallel to the first central beam is equal to the wave vector. The same applies to the second central beam.

The direction of the wave vector component which is perpendicular to the first central beam and the direction of the wave vector component which is perpendicular to the second central beam are opposing directions. An interference pattern is thus obtained for any image points of the original image to be imaged. Preferably, the value of the wave vector component which is perpendicular to the first central beam and the value of the wave vector component which is perpendicular to the second central beam are equal at the superposition point. This has the advantage that the $k_{perpendicular}=0$ interference arising when the two central beams are superimposed has a greater, in particular maximal, interference contrast.

Starting from the central image point, for any two-dimensional deviation perpendicular to the optical axis it holds that, at the superposition point, the wave vector component of the first light beam, which is perpendicular to the first central beam, and the wave vector component of the second light beam, which is perpendicular to the second central beam, are in opposite directions, preferably are equal but in opposite directions. This can generally be achieved only by a three-dimensional interferometer set-up.

The aforementioned fact, which can be regarded as a central finding of the present invention, can be clearly demonstrated in FIG. 6.

In FIG. 6, the first central beam 112 and the second central beam 118, which are both emitted from the central image point 154, run along the negative z axis and respectively impinge on a first beam deflecting element 104 and a second beam deflecting element 106. The first central beam 112 is deflected in the direction of the x axis by the first beam deflecting element 104, and the second central beam 118 is deflected in the direction of the negative x axis by the second beam deflecting element 106.

The arrangement of the axes is selected arbitrarily in FIG. 6 and in all other exemplary embodiments of this invention and is non-limiting.

In the present case, the first central beam 112 and the second central beam 118 are each shown parallel to the z axis. This means that the object 156 to be imaged is at an infinite distance.

The first central beam 112 is then deflected in the direction of the y axis by the third beam deflecting element 108, which is located at the origin of the coordinate system selected here, whereupon the first central beam 112 impinges on a detector 125 having a detection plane 126. The detector 125 may preferably comprise a CCD sensor or a CMOS sensor or an active-pixel sensor (APS). Preferably, the detector 125 has two-dimensional arrangements or arrays of the aforementioned sensors.

The second central beam 118, after it has been deflected in the direction of the negative x axis by the second beam deflecting element 106, is deflected in the direction of the y axis, like the first central beam 112, by the fourth beam deflecting element 110. Since the third beam deflecting element 108 is configured as a semi-transparent mirror, the first central beam 112 and the second central beam 118 can thus be superimposed behind the third beam deflecting element 108 as seen in the direction coming from the fourth beam deflecting element 110. The superposition point 157 is thus located on the third beam deflecting element 108 or on the half-line behind the third beam deflecting element 108 at any position on the y axis.

A small deviation of the direction of propagation of the first central beam 112 or of the second central beam 118 away from the negative z axis along the xy plane leads, after the reflections at the four beam deflecting elements, to the situation whereby the first central beam 112 propagates substantially along the y axis, but also has a small component in the xz plane, and the second central beam 118 likewise propagates substantially along the y axis and likewise has a small component in the xz plane, but in the exact opposite direction to the corresponding component 164 of the first central beam 112. It can thus be said that the perpendicular wave vector component of the first central beam 112 at the superposition point 157 is equal but in an opposite direction to the corresponding perpendicular wave vector component 166 of the second central beam 118. This property of the invention leads to the situation whereby each image point of the original image to be imaged generates, apart from certain symmetries, a different interference pattern on the detector. The aforementioned symmetries can be ruled out by varying the optical path of an interferometer arm. It is thus possible to identify unambiguously each image point of the original image to be imaged and thus to define unambiguously the relative position of each image point of the original image to be imaged relative to the interferometer used. It appears that this property is possible only with an interferometer which has a three-dimensional structure.

It is notable that the fact discussed above, which can be regarded as a central finding of the present invention, also applies to original images which are to be imaged and which are not at an infinite distance. In this case, the two central beams are not parallel to one another but rather are generally divergent. If the optical axis is defined as the angle bisector between the first central beam 112 and the second central beam 118, this does not require any parallel central beams. The arrangement plane is in this case likewise well defined, and namely it can be defined as a plane perpendicular to the optical axis. Light beam is a term used in geometrical optics and is defined independently of whether an object is or is not at an infinite distance. The wavefront can be determined via multiple light beams according to the rules of geometrical optics. It is the surface that is normal to the direction of the respective light beam. For an original image at finite distance from the interferometer, this construction results in spherical, that is to say curved, wavefronts. In the present invention, the curvature of the wavefronts has an effect in both interferometer arms, the effects of the wavefront curvature on the interferometric pattern more or less cancelling one another out. Therefore, despite a wavefront curvature, an interferogram that is dependent on the position of the original image point can thus be measured even for objects at a finite distance. The difference of the perpendicular wave vector components is defined as the difference between the perpendicular wave vector component of the first light beam relative to the first central beam and the perpendicular wave vector component of the second light beam relative to the second central beam. This definition is well defined and is independent of whether the object is at a finite or infinite distance. This independence from the object distance has been able to be proven through experiments. This finding is an important finding of the invention.

One significant advantage of the invention lies in the fact that an original image is imaged and can be reconstructed using the method described below, wherein only flat reflective elements are used. This enables an inexpensive and lightweight construction of the present device. The device according to the invention is thus suitable for lenses. This also enables a use in wavelength ranges in which there are no lenses due to a lack of available transparent media, such as for example in deep UV.

Preferably, the difference of the light beam reflections in the first interferometer arm and the light beam reflections in the second interferometer arm is an even number. This means that the number of reflections in each interferometer arm is either even or odd. Here, a reflection at a D-shaped mirror (for an explanation of the term D-shaped mirror, see DE 10 2013 101 856.4) is also to be regarded as a reflection.

The imaging by a mirror can be expressed as follows for the non-limiting case where the coordinate system is selected in such a way that the z axis lies along the surface normal of the mirror:

$$(k_x, k_y, k_z) \rightarrow (k_x, k_y, -k_z)$$

wherein $k_x$, $k_y$ and $k_z$ are the components of the wave vector k of a light beam incident on the mirror. This imaging property of a mirror cannot be achieved by one or more linked rotations since a mirror changes the direction of rotation of a circular movement. By way of example, after reflection at a mirror, left-circularly polarized light becomes right-circularly polarized light. This preferred property regarding the number of reflections thus means that the optical imaging via the first interferometer arm and the optical imaging via the second interferometer arm either leads in both arms to a reversal of the direction of rotation or leads in both arms to a maintaining of the direction of rotation. If the direction of rotation is maintained, there is thus no difference between the first interferometer arm and the second interferometer arm. This property will be referred to below as "maintaining the relative direction of rotation".

Creating an interferogram that is dependent on the position of the original image point requires that there is a position-dependent difference between the first interferometer arm and the second interferometer arm. Without being limited to one particular theory, it can be assumed that the effect of a position-dependent difference for an interferometer set-up where the central beams and the arrangement plane lie in the same two-dimensional plane is not possible while at the same time maintaining the relative direction of rotation. The reason is to be sought, inter alia, in the property that rotations in two dimensions swap over, that is to say form a commutative group. Since by this assumption there is also no difference between the interferometer arms when the direction of rotation is maintained, there is no remaining property that could lead to the creation of an interferogram that is dependent on the position of the original image point. The first central beam, which runs through the first interferometer arm, has at the superposition point the same wave vector as the second central beam, which runs through the second interferometer arm. This means that the imaging of the original image point is fixed for this spatial direction and, for a displacement of the original image point away from the central image point, can lead only to a same-sign change of the wave vectors in the first interferometer arm and the second interferometer arm. A different-sign change, as required by the present invention, would mean for an interferometer in two dimensions that the imagings by the two interferometer arms would deliver a different result for the maintaining of the direction of rotation. An interferogram that is dependent on the position of the original image point is thus not possible, assuming that the direction of rotation is maintained, for a two-dimensional interferometer.

In contrast, rotations in three dimensions do not have this property of being able to be swapped over. Three-dimensional interferometers therefore form the subject matter of the present invention. Three-dimensional interferometers or interferometers having a three-dimensional set-up will be understood to mean interferometers in which the central beams do not lie, in particular not even approximately, in the arrangement plane of the interferometer. Two-dimensional interferometers or interferometers having a two-dimensional set-up will be understood to mean interferometers in which the central beams and the components of the interferometer lie in one plane.

If, in an interferometer according to the invention, an additional reflection, for example by an additional mirror, is introduced in one of the interferometer arms, then this new interferometer no longer has the desired property of opposite wave vector components for one spatial direction, namely for the spatial direction that has been reflected by the mirror. The reason for this is that the interferometer previously had this property for this direction and loses it due to the mirror.

As an additional property, it may be required that the imaging properties of the first beam deflecting element and of the second beam deflecting element are transformed by a rotation through an angle of 150° to 210°, particularly preferably through 180°. To this end, the rotation takes place preferably about an axis of rotation which, apart from a translation, forms with the optical axis an angle less than 30°, preferably less than 20° or particularly preferably less than 10°. The optical axis can in this case be defined, starting from the central image point, as the angle bisector between the first and the second central beam. The overlapping necessary for the interference takes place in an interferometer at a point which lies approximately in the arrangement plane. The arrangement plane can in this case be defined as the plane which is normal to the optical axis and in which the first beam deflecting element is situated.

The described classification of interferometers can be completed as follows: As mentioned above, a two-dimensional interferometer with maintaining of the relative direction of rotation does not have the properties of the invention. If, in such an interferometer, an additional mirror is then introduced in one of the interferometer arms, the property of opposite perpendicular wave vector components then occurs for this direction. However, this occurs only for the direction that has been reflected by the mirror, but not for the directions orthogonal thereto. It is therefore assumed that no interferometer having the properties of the invention can be formed from a two-dimensional interferometer, even by introducing an additional mirror.

The object of the invention is also achieved by a method for reconstructing an original image from an image measured using an interferometer according to the invention, and by a method for calibrating an interferometer according to the invention. The method for calibrating an interferometer according to the invention serves the purpose of carrying out the method for reconstructing an original image from an image measured using an interferometer according to the invention. Both methods thus solve the same problem.

An original image will be assumed here to be composed of image points, wherein the original image points correspond to the resolution capability of the device. Since the different original image points lead to different interferograms, the method ensures that an intensity distribution of the original image points is calculated in the context of the resolution capability, which upon imaging by the device results in the measured superimposed interferogram ("solving the inverse problem"). Here, in the context of the resolution capability, the calculated intensity distribution corresponds to the actual intensities of the original image points. This method enables a resolution of a spatial cone around the central image point, wherein, for a fixed original image point direction, the interferogram does not depend on the distance of the original image point on the beam. The method according to the invention reconstructs the original image without any distance determination being necessary. However, distance measurements are also possible, but only by triangulation.

In the method for calibrating an interferometer according to the invention, the following steps are carried out for at least one optical path length difference $\delta_t$ between the first interferometer arm and the second interferometer arm and for at least one wavelength $\lambda_s$ which is emitted by an original image: creating a pixel raster (i, j) for the original image, creating a pixel raster (m, n) for an image, successively generating a light-emitting pixel of the pixel raster of the original image with a normal intensity, the remaining pixels being dark, for each individual pixel of the pixel raster of the original image to be imaged, and, for each light-emitting pixel of the pixel raster of the original image, detecting intensities ($\varphi_{m,n,t}(i,j,s)$) of the pixel raster (m, n) of the image.

The calibration of the interferometer is therefore not exclusively determined by the interferometer itself but rather also depends on the original image or image, in particular on the wavelength to be measured or the wavelengths to be measured and on the selected image segment.

With regard to the wavelengths, the method can be carried out in two different ways. According to the first type of implementation, the method is carried out for at least one wavelength which is emitted by the original image. According to the second type of implementation, the method is carried out for at least one wavelength which is emitted by the image. The second type of implementation is preferably carried out when the image itself is not available or is only poorly available.

The path length difference between the first interferometer arm and the second interferometer arm is denoted by $\delta$. This path length difference can preferably be varied by inserting in one of the two interferometer arms a device which changes the optical path. Said device can preferably be embodied by rotating optical discs, devices which use the electro-optic effect, such as for example a Pockels cell, an electro-optic modulator, a Kerr cell or the like. If the method described here is carried out for a plurality of path length differences, the plurality of path length differences used is denoted by $\delta_t$, where t is an index. If the path length differences used are equidistant, $\delta_t$ can be presented as $\delta_t=t*\Delta\delta$, where $\Delta\delta$ is a constant.

The light wavelength used is denoted by $\lambda$. If the method described here is carried out for a plurality of wavelengths, the plurality of wavelengths used is denoted by $\lambda_s$, where s is an index. If the wavelengths used are equidistant, $\lambda_s$ can be presented as $\lambda_s=s*\Delta\lambda$, where $\Delta\lambda$ is a constant. If the object to be imaged emits a plurality of wavelengths, the method may be carried out for these wavelengths, that is to say for all emitted wavelengths. However, the method may also be carried out only for some of the wavelengths emitted by the object to be imaged.

If the object to be imaged has a continuous spectrum, certain wavelengths can be selected. This may take place for example in such a way that the smallest and the largest wavelength and also a certain number of wavelengths between these two are used for the method. The wavelengths between the smallest and largest wavelength can be selected for example to be equidistant.

The selection may preferably also take place in such a way that the number of wavelengths selected is sufficient that the equation system to be solved, which is described below, can be solved, in particular that the interference pattern can be interpolated for wavelengths situated therebetween.

For the extreme case of white light emission, a path length variation $\delta_t$ of N/2 wavelengths can be selected for a resolution of the original image of N×N pixel points, where N is an integer greater than 1. For example, a path length variation $\delta_t$ of 500 wavelengths can be selected for a resolution of the original image of 1000×1000 pixel points. In other words, using the central wavelength $\delta_{central}$ results in $\delta_t = t \ast \Delta\delta$, and t runs from 0 to N, for example to 1000 for the aforementioned specific case. By virtue of this selection, the original image is captured in a spatially resolved and frequency resolved manner, which in the technical jargon is also known as a "spectral hypercube".

The pixel raster (i, j) for the original image to be imaged can be created as follows. For example, the central image point is selected as the origin of the coordinate system of the pixel raster. As the plane in which the coordinate system of the pixel raster is to run, it is possible to select for example a plane which runs substantially perpendicular to a connecting line between the original image and the interferometer. Here, for example, the connecting line starting from the central image point as the angle bisector between the first central beam and the second central beam may be selected. As axes of the coordinate system, it is possible to select any two axes which are perpendicular to one another and which run in this plane. In the aforementioned coordinate system, any point on the pixel raster then has an x coordinate of the form $i \ast \Delta x_u$ and an x coordinate of the form $j \ast \Delta y_u$. The variables $\Delta x_u$ and $\Delta y_u$ are the step widths of the selected raster. The indices i and j are representative of this selected raster.

The raster may be selected for example in such a way that it corresponds to the resolution capability of the interferometer. Starting from the central image point, the resolution capability is defined by the fact that an image point can be distinguished from the central image point when the complete interference pattern in the context of the displacement of the original image points forms a destructive and a constructive interference. In other words, on the image rastered with (m, n), a constructive interference is obtained for one sub-region and a destructive interference is obtained for another sub-region. Located therebetween is a so-called "node line", where the interference changes from destructive to constructive. The central image point represents a $k_{perpendicular}=0$ interference, that is to say it does not have this property. The slightest displacement which forms this property for the first time determines the optical resolution. This is preferably equated to $\Delta x_u$ and $\Delta y_u$.

The pixel raster (m, n) for the image to be measured can be created as follows. The image to be measured can be measured for example on a detector. The detector surface may for example be flat. A point located in the centre of this detector surface can be selected as the origin of the coordinate system of the pixel raster for the image to be measured. As the plane in which the coordinate system of the pixel raster is to run, it is possible to select for example the plane in which the detector surface lies or, if not identical, a plane which is perpendicular to the two superimposed central beams. As the axes of the coordinate system, it is possible to select any two axes which are perpendicular to one another and which run in this plane. In the aforementioned coordinate system, any point on the pixel raster then has an x coordinate of the form $m \ast \Delta x$ and an x coordinate of the form $n \ast \Delta y$. The variables $\Delta x$ and $\Delta y$ are the step widths of the selected raster. The indices m and n are representative of this selected raster. Preferably, the variables $\Delta x$ and $\Delta y$ are selected in such a way that the raster gives a number of pixels that is at least equal to or even greater than in the original image space, which in the technical jargon is also known as "oversampling".

Using the two rasters of the original image and of the image, it is determined, for each pixel of the original image raster which emits with a standard intensity, how the intensity distribution $\varphi_{m,n,t}(i,j,s)$ is on each pixel of the raster of the image. Here, the indices i, j represent parameters for the rasterization of the original image and s represents the indexing or rasterization of the wavelength. For different i, j and s, different intensity distributions on the detector surface are obtained.

For each raster point on the original image, the intensities $I_{i,j,s}$ indicate the intensity thereof at the wavelength having the index s. If the rasters of the original image and of the image and the indexing of the wavelengths are sufficiently fine, then it holds precisely that the sum over all indices i, j and s of the product of the interferogram, at standard intensity $\varphi_{m,n,t}(i,j,s)$ with the respective intensity of the pixel (i, j) at the wavelength of index s, which is denoted as $I_{i,j,s}$, is equal to the measured intensity distribution at the pixels m, n of the pixel raster (m, n) for the image to be measured, which is denoted as $\Phi_{m,n,t}$:

$$\sum_{m,n,t} I_{i,j,s} \cdot \varphi_{m,n,t}(i, j, s) = \Phi_{m,n,t}$$

Here, $\Phi_{m,n,t}$ is the measured intensity distribution at the pixels m, n of the pixel raster (m, n) for the image to be measured. This equation is called the imaging equation.

By inverting the matrix $\varphi_{m,n,t}(i,j,s)$ consisting of the rows m, n and t and the columns i, j and s, the imaging equation can be rewritten as:

$$\sum_{m,n,t} M_{m,n,t}(i, j, s) \cdot \Phi_{m,n,t} = I_{i,j,s}$$

where $M_{m,n,t}(i,j,s)$ is the matrix that is the inverse of the matrix $\varphi_{m,n,t}(i,j,s)$. The matrix $M_{m,n,t}(i,j,s)$ is thus a property of the interferometer and the detection of this matrix can be interpreted as a calibration since, by measuring a light distribution $\Phi_{m,n,t}$ at the pixels m, n of the pixel raster (m, n) for the image to be measured and then multiplying the matrix $M_{m,n,t}(i,j,s)$ according to the above formula, the intensities of the pixel raster of the original image can be calculated.

The matrix $M_{m,n,t}(i,j,s)$ determined for a given system can be stored for example in the interferometer itself, in an external memory or in an evaluation circuit which calculates the corresponding original image from the measured interferogram data. An interferometer with an evaluation circuit or an interferometer which can access the external memory is thus calibrated.

The calibration method can be substantially simplified if the procedure described experimentally here is calculated at least partially by in particular numerical simulation or a model of the specific device.

The imaging equation described above can more or less always be solved, in particular by applying the method of singular value decomposition.

In the case of a symmetrically constructed interferometer, the functions $\varphi_{m,n,t}(i,j,s)$ correspond to plane waves (that is to say sine or cosine functions), the indices corresponding to the pixels on which measurements take place. The formation of the inverse matrix then corresponds to an inverse Fourier transform.

In contrast to the known prior art, the position of the image points of the original image is determined not by the position of a focal point on a detector, for example by the use of a focusing imaging system, but rather by a numerical back-transformation of interferograms.

The numerical stability of the image reconstruction is improved if the so-called "stationary phase point" is situated on or almost on the illuminated detector surface. The "stationary phase point" can be found empirically as follows. First, the $k_{perpendicular}=0$ interference is observed for the central image point, wherein, in order to simplify the illustration, it will be assumed that the arm lengths of the interferometer are set in such a way that a uniform constructive interference has been set. The original image point is then moved away from the central image point and the interference image for this light-emitting image point is considered in isolation. If successively a completely destructive interference is obtained in one region of the detector, while the constructive interference remains at 100% in another part of the detector surface, then the centre of this constructive interference is the "stationary phase point". In contrast, if an almost destructive and then possibly once again an almost constructive interference is obtained across the entire detector and thus an interference that is completely modulated on the detector surface is obtained only after several of these oscillations, that is to say an interference band having a region of completely constructive interference and a region of completely destructive interference, then the "stationary phase point" is not situated on the detector. However, by extrapolating the intensity variation, it is possible to determine the point where the point of constant constructive interference would lie. This point then lies outside of the illuminated detector surface after construction. It is plausible that the numerical stability is better for the case where the stationary phase point is situated at least approximately on the detector and thus the interference modulation is always complete. In one embodiment of the device according to the "division of amplitude" principle, the stationary phase point is generally situated inside the detector surface.

In the case of devices which are facetted or constructed using multiple mirrors according to this invention, the "stationary phase point" may be in one of the optional plurality of illuminated areas on the detector. For the "division of wavefront" scenario, the stationary phase point is situated at the edge of the illuminated detector area, if the apertures for light entry into the first interferometer arm and the second interferometer arm geometrically bound one another. Constellations in which the apertures are spatially arranged at a considerable distance from one another may be of interest when additional information for the image reconstruction is available via the measurement task or via additional measurements, for example a spatially fixed further device according to this invention.

In the method for reconstructing an original image from an image measured using an interferometer according to the invention, the following steps are carried out for at least one optical path length difference $\delta_t$ between the first interferometer arm and the second interferometer arm and for at least one wavelength $\lambda_s$ which is emitted by an original image: detecting intensities of pixels of a pixel raster of an image, and calculating intensities of pixels of a pixel raster of the original image on the basis of the intensities of the pixels of the pixel raster of the image which are recorded during the calibration. As already discussed above, when using suitable rasters, the intensities of a pixel raster of the original image can be calculated from the measured intensities of a pixel raster of an image to be measured.

As already discussed above, the main work of the method for calibrating the interferometer is performed in the method for reconstructing an original image from an image measured using an interferometer according to the invention. This is because, when the calibration has been successfully carried out, that is to say when the matrix $M_{m,n,t}(i,j,s)$ has been successfully determined, the reconstruction consists only in measuring the intensity distribution $\Phi_{m,n,t}$ on the detector in the selected raster and calculating the intensity distribution of the original image by insertion in the inverse imaging equation $$\sum_{m,n,t} M_{m,n,t}(i,j,s) \cdot \Phi_{m,n,t} = I_{i,j,s}$$

The device according to the invention can also be used for the lensless determination or lensless imaging of an original image to be imaged. The term lensless means in particular that only reflective surfaces are used, which in particular are flat.

The device according to the invention can also be used to ascertain an incidence direction of an image point of an original image relative to the device according to the invention. This can take place for multiple or all wavelengths of the original image to be imaged.

The device according to the invention can also be used to reconstruct an original image from an image measured using a device according to the invention.

According to one further development, the interferometer has a detector. In this case, the superposition point preferably lies on a detection plane of the detector. Furthermore, the first or second central beam may impinge on the detector or the detection plane at an angle. The angle at which the first or second central beam impinges on the detector or the detection plane is preferably less than or equal to 45°, particularly preferably less than or equal to 20°, and even more preferably less than or equal to 10°. With particular preference, the first or second central beam impinges perpendicularly on the detector or the detection plane.

The detector may preferably comprise a CCD sensor or a CMOS sensor or an active-pixel sensor (APS). Preferably, the detector has two-dimensional arrangements or arrays of the aforementioned sensors.

According to one further development, the first interferometer arm has a first beam deflecting element and a third beam deflecting element, and the second interferometer arm has a second beam deflecting element and a fourth beam deflecting element.

According to one further development, the first central beam or the first light beam impinges in the first interferometer arm on the first beam deflecting element and thereafter on the third beam deflecting element, and the second central beam or the second light beam impinges in the second interferometer arm on the second beam deflecting element and thereafter on the fourth beam deflecting element.

Besides deflecting a light beam in a desired direction, a beam deflecting element may preferably also bring about a beam offset. A beam deflecting element may for example also bring about an increase or reduction in size.

In one preferred further development, a beam deflecting element is designed in such a way that a light beam incident on the beam deflecting element can be deflected multiple times at different points. The point of impingement of a light beam incident on the beam deflecting element may thus differ from the point of exit of a light beam exiting from the beam deflecting element. In the case of a flat mirror with a reflectance of 100%, the point of impingement and the point of exit coincide.

A beam deflecting element can thus also be formed by a crossed arrangement of two D-shaped mirrors, as can be seen for example in FIG. 9. In this case, the point of impingement and the point of exit of the beam deflecting element do not coincide.

According to one further development, at least one among the set consisting of the first beam deflecting element, the third beam deflecting element, the second beam deflecting element and the fourth beam deflecting element comprises at least one diffractive optical element (DOE), in particular a grating. A DOE can be formed by a very lightweight component. A DOE can perform the function of a beam splitter. A DOE acts as a beam splitter when the beam incident on the DOE diffracts in the first and negative-first order and the zero order is almost suppressed or not used. In this case, the intensity in the first and negative-first order is preferably approximately equal.

According to another further development, at least one among the set consisting of the first beam deflecting element, the third beam deflecting element, the second beam deflecting element and the fourth beam deflecting element comprises at least one dielectric medium.

The dielectric medium preferably has the shape of a prism. The chromatic aberration or dispersion that exists with a prism leads to a wavelength-dependent beam deflection. If the device according to the invention takes account of the preferred embodiment in which the first beam deflecting element and the second beam deflecting element can be transformed into one another by a rotation, the dispersive influences between the two interferometer arms compensate one another in such a way that the point of overlap is shifted in place on the detector plane for the different wavelengths, but an overlap still always occurs between the two identical beams. In other words, an overlap occurs regardless of the wavelength.

A further important finding of the invention can be considered to be the fact that, in the case of an interferometer which has a respective D-shaped mirror as the first and second beam deflecting element, the associated facet-induced optical path length difference for the two interferometer arms is equal and thus is compensated if the design takes account of the rotational symmetry between the first beam deflecting element and the second beam deflecting element. This makes it possible to use a compact embodiment of D-shaped mirrors for interferometers according to the invention.

According to another further development, the first beam deflecting element is preferably arranged in an arrangement plane which is spanned by the first beam deflecting element and a plane perpendicular to an optical axis, wherein the optical axis, starting from the central image point, is defined by the angle bisector between the first central beam and the second central beam. In this case, the second beam deflecting element is arranged in such a way that the distance of the second beam deflecting element from the arrangement plane is smaller than the distance of the second beam deflecting element from the optical axis. Furthermore, the third beam deflecting element, the fourth beam deflecting element and the superposition point are in this case arranged in such a way that the distance of the third beam deflecting element, of the fourth beam deflecting element and of the superposition point from the arrangement plane is in each case smaller than the distance of the third beam deflecting element from the optical axis.

According to one preferred further development, the first beam deflecting element is arranged in an arrangement plane which is spanned by the first beam deflecting element and a plane perpendicular to an optical axis. The optical axis, starting from the central image point, is in this case defined by the angle bisector between the first central beam and the second central beam.

The second beam deflecting element is arranged in such a way that a connecting line between the point of impingement of the first central beam on the first beam deflecting element and the point of impingement of the second central beam on the second beam deflecting element and the arrangement plane enclose an angle less than or equal to 30°. This angle is preferably less than or equal to 20°, more preferably less than or equal to 10°, even more preferably less than or equal to 5°, and most preferably equal to 0°.

The third beam deflecting element is preferably arranged in such a way that the first central beam between the first beam deflecting element and the third beam deflecting element and the arrangement plane enclose an angle less than or equal to 30°. This angle is preferably less than or equal to 20°, more preferably less than or equal to 10°, even more preferably less than or equal to 5°, and most preferably equal to 0°.

The fourth beam deflecting element is preferably arranged in such a way that the second central beam between the second beam deflecting element and the fourth beam deflecting element and the arrangement plane enclose an angle less than or equal to 30°. This angle is preferably less than or equal to 20°, more preferably less than or equal to 10°, even more preferably less than or equal to 5°, and most preferably equal to 0°.

The third beam deflecting element and the fourth beam deflecting element are preferably arranged in such a way that the connecting line between the point of impingement of the first central beam on the third beam deflecting element and the superposition point and/or the connecting line between the point of impingement of the second central beam on the fourth beam deflecting element and the superposition point each enclose with the arrangement plane an angle less than or equal to 30°. These angles are preferably less than or equal to 20°, more preferably less than or equal to 10°, even more preferably less than or equal to 5°, and most preferably equal to 0°.

According to one further development, the first central beam deflected by the third beam deflecting element and the second central beam deflected by the fourth beam deflecting element are superimposed.

According to one further development, the first central beam deflected by the third beam deflecting element and/or the second central beam deflected by the fourth beam deflecting element preferably impinge perpendicularly on the detection plane of the detector.

According to one further development, the first central beam, the second central beam and the optical axis lie in one plane.

According to another further development, the first beam deflecting element, the second beam deflecting element, the third beam deflecting element and the fourth beam deflecting element are arranged in one plane, for example in the arrangement plane.

According to another further development, it is preferred that the optical imaging which transforms the first central beam prior to impingement on the first beam deflecting element into the first central beam after the impingement on the first beam deflecting element, and the optical imaging which transforms the second central beam prior to impingement on the second beam deflecting element into the second central beam after the impingement on the second beam deflecting element, can be transformed into one another by a rotation through a rotation angle of between 150° and 210° about an axis of rotation and/or by a displacement along a displacement vector. The rotation angle is preferably between 170° and 190° and is even more preferably exactly 180°. The displacement vector is preferably a vector having a value that is less than the maximum distance within the interferometer, and even more preferably the zero vector if the origin of the rotation is suitably selected.

The aforementioned property of the two optical imagings which can be transformed into one another is also a property of the two interferometer arms since the respective beam deflecting elements are arranged in the interferometer arms. One preferred further development of an interferometer has two interferometer arms which can be transformed into one another by a rotation through a rotation angle of between 150° and 210° about the axis of rotation and/or by a displacement along a displacement vector. The rotation angle is preferably between 170° and 190° and is even more preferably exactly 180°. The displacement vector is preferably a vector having a value that is less than the maximum distance within the interferometer, and even more preferably the zero vector if the origin of the rotation is suitably selected.

In one preferred further development, the first and second beam deflecting element are arranged and constructed in such a way that the first beam deflecting element can be transformed into one another by a rotation through a rotation angle of between 150° and 210° about the axis of rotation and/or by a displacement along a displacement vector. The rotation angle is preferably between 170° and 190° and is even more preferably exactly 180°. The displacement vector is preferably a vector having a value that is less than the maximum distance within the interferometer, and even more preferably the zero vector if the origin of the rotation is suitably selected.

According to another further development, the axis of rotation encloses with the optical axis an angle less than or equal to 30°. This angle is preferably less than or equal to 20°, even more preferably less than or equal to 10°, and most preferably less than or equal to 5°. Furthermore, it is preferred that the axis of rotation coincides with the optical axis.

According to another further development, the first beam deflecting element and the second beam deflecting element are contained in a single device. This may be formed for example by a beam splitter, which deflects the light incident from the object to be imaged into two different directions, for example into the first interferometer arm and the second interferometer arm.

According to another further development, the third beam deflecting element and the fourth beam deflecting element are contained in a single device. This may be formed for example by a beam combining device, which combines the light beams coming from the interferometer arms or the light beams impinging on the third beam deflecting element and the fourth beam deflecting element in order to form a single light beam. Preferably, the beam combining or the bringing-together of the light beams takes place in a coherent manner.

According to another further development, at least one among the set consisting of the first beam deflecting element, the third beam deflecting element, the second beam deflecting element and the fourth beam deflecting element comprises at least one semi-transparent mirror. By virtue of a semi-transparent mirror, for example a light beam impinging on the front side of the semi-transparent mirror and a light beam impinging on the rear side of the semi-transparent mirror can be combined on the front side of the semi-transparent mirror in order to form a common beam.

According to another further development, the optical axis and the first central beam at the superposition point enclose an angle between 45° and 135°. This angle is preferably between 60° and 120°, even more preferably between 75° and 105°, and most preferably the angle is equal to 90°.

According to another further development, at least one beam expander is arranged between the object to be imaged on the one hand and the first interferometer arm and the second interferometer arm on the other hand. The term beam expander is to be understood in a general sense and also encompasses beam reducers. By virtue of this further development, it is possible to create a microscope or a telescope.

According to another further development, at least one beam splitter is arranged between the object to be imaged on the one hand and the first interferometer arm and the second interferometer arm on the other hand. In this case, the beam splitter can be used to split into the two interferometer arms the light coming from the object to be imaged.

According to another further development, at least one beam combining device is arranged between the third beam deflecting element and the fourth beam deflecting element on the one hand and the superposition point on the other hand. The beam combining device may serve for example to combine the light beams of the two interferometer arms. The two combined light beams can then interfere at the superposition point. The beam combining device may comprise for example a DOE. In this case, the DOE can be used the other way round for normal beam guidance. In this case, for example, the first and negative-first diffraction order can be used as the two beams to be combined, and a beam impinging as normal can be used as the exiting combined beam.

According to another further development, a beam deflecting element comprises at least one D-shaped mirror arrangement or at least one D-shaped mirror. The D-shaped mirror arrangement preferably comprises at least one D-shaped mirror.

A D-shaped mirror can be understood to mean for example a dispersive mirror, that is to say an optical device having at least one reflective element and at least one dispersive element, such as for example a dielectric medium.

According to one further development, a D-shaped mirror comprises the following: a second dielectric medium having a light incidence surface and a refractive index greater than 1.3, and at least two mirror elements arranged downstream of the light incidence surface for deflecting the light beam into a light beam exiting from the at least one D-shaped mirror, wherein the preferably rotatable mirror elements are each arranged adjacent to one another, wherein the mirror elements each have a flat reflective surface, wherein the second dielectric medium completely fills a space between the reflective surfaces of the mirror elements and the light incidence surface, and wherein the mirror elements have a size greater than 0.1 mm.

According to another further development, the at least one D-shaped mirror arrangement comprises the following: a first D-shaped mirror and a second D-shaped mirror, wherein the first D-shaped mirror and the second D-shaped mirror are arranged in such a way that the incident light beam impinges firstly on the first D-shaped mirror and then is deflected by the first D-shaped mirror onto the second D-shaped mirror, the mirror elements of the first and/or second D-shaped mirror each lie in one plane, the light incidence surface of the first and/or second D-shaped mirror is a plane, the plane of the mirror elements of the first and/or second D-shaped mirror is parallel to the light incidence surface of the first and/or second D-shaped mirror, and a perpendicular standing on the light incidence surface of the first D-shaped mirror forms with a perpendicular standing on the light incidence surface of the second D-shaped mirror an angle of 70° to 110°. This angle is preferably between 80° and 100°, and even more preferably it is exactly 90°.

According to another further development, at least one of the beam deflecting elements has a device for displacement in one direction in space. Starting from a basic position, the beam deflecting element in question can be displaced in space. As a result, it is possible for example that the optical path of the interferometer arm in which the beam deflecting element in question is located can be changed, that is to say lengthened or shortened. In this case, it is possible if necessary to readjust the beam deflecting element. If the beam deflecting element to be displaced serves to combine the two interferometer arms, the displacement in space can bring about a change in the difference of the optical paths of the interferometer arms, for example the optical path of one interferometer arm may become longer while the optical path of the other interferometer arm becomes shorter. As a result, any ambiguities in determining the position of the image point in question can be eliminated. In the case of a monochromatic application, a variation by half a wavelength may be sufficient for this. This variation may be generated for example electro-optically. The signal modulation may additionally be used for a lock-in detection of the interference image. The image signal can thus be improved considerably in terms of the signal-to-noise ratio and in terms of eliminating scattered light.

The interferometer, in particular the detector, may also preferably have a device which captures the interference pattern of the light beams running through the two interferometer arms for different positions of the device for displacement in one direction in space.

According to another further development, a beam deflecting element has a device for changing an optical path within the beam deflecting element. In this case, the optical path travelled by the light is achieved without any displacement of the device. This may be formed for example by devices which use the electro-optic effect, such as for example a Pockels cell, an electro-optical modulator or a Kerr cell. As a result, any ambiguities in determining the position of the image point in question can be eliminated.

According to another further development, a beam deflecting element comprises a prism which is operated in transmission. This may be a prism which is mirrored on one side. In this case, the incident beam can enter through one side of the prism, be reflected at an adjacent, mirrored side of the prism, and exit through the third side of the prism. This has the advantage that the detector size and the pixel spacing on the detector can be adapted to the device.

The invention can be used in particular in the following sectors:

A) Surface checking, machine vision. This relates in particular to the following tasks: surface defect detection, shape and size checking, position detection, surface inspection and object recognition. One important sector here is the quality assurance of components for example, and process control. The present invention is suitable for examining the properties of a surface at high resolution, for example using visible light in the range from $10^{-7}$ to $10^{-6}$ m and at a relatively great working distance, for example 1 m. Using the Abbe formula, the resolution capability can be calculated for given distances and wavelengths. For a detector of size 50 mm×50 mm, a working distance of 1 m, a refractive index in air of 1, and a wavelength of 500 nm, the resolution capability is 10 μm.

The imaging quality is defined solely by the diffraction limit, independently of imaging errors. It is also of interest here that the pixel size of the detector does not limit the resolution capability of the device. This can be seen in the fact that the resolution is defined by the first basic mode of the interference pattern on the detector and thus corresponds to a large-surface-area structure with a node line. The device therefore places low requirements on the detector quality. This may be of interest for unusual wavelength ranges, such as for example UV, IR or far IR, where measurement tasks do exist but there are no available lens systems.

The surface to be measured need not be flat since the measurement technique proposed by the invention operates independently of a focus, as is known from conventional imaging systems using lenses. The measurement technique can at the same time be used with multiple wavelengths and therefore enables chemical and structural selectivity.

The measurement option of the Fourier transform spectrometer, which automatically exists according to the measurement principle, enables a spatially resolved spectral analysis if necessary. Conventional lens systems can be combined with a Fourier transform spectrometer only with high additional effort, since there is no area with a parallel beam path.

Furthermore, the possibility exists of combining the measurement method with a phase-sensitive measurement technique, such as lock-in for example, wherein the measurement signal can be combined with the variation of the path length in an interferometer arm. Both a good scattered light suppression and a considerable improvement in the signal-to-noise ratio can thus be achieved.

Use of the system according to the invention thus offers advantages in the case where small structures have to be analysed two-dimensionally with high resolution. Examples are structures in micromechanics, semiconductor technology, surface machining, welding technology or barcodes.

B) The measurement technique described in point A makes it possible, via the angle measured by the device and a suitable trigonometric evaluation, to reconstruct a wavelength-calibrated three-dimensional model of the object to be measured. For this, it is necessary to measure the object from at least two viewing angles. Since this is an interferometric method, the device is automatically calibrated by the fixed wavelength of the measurement light used. In comparison to laser scanning methods, the technique according to the invention has the advantage of a higher spatial resolution, namely at the diffraction limit, and the parallel multichannel evaluation. In contrast, a conventional scanning system has only a single-channel evaluation. The use of the system according to the invention thus also offers advantages in the case where small structures have to be analysed three-dimensionally with high resolution.

Examples are structures in micromechanics, semiconductor technology, surface machining and welding technology.

C) The option of using the invention also for small distances makes it possible to use the advantages of the invention also for microscopic applications. The resolution that can be achieved is defined by the Abbe limit, as in the case of a lens system. However, the system according to the invention is not adversely affected by lens defects, particularly when the beam manipulation is achieved in a lensless fashion through in particular flat mirrors, dispersive flat mirrors, for example D-shaped mirrors, or diffractive elements. For the far UV range, atomic grating structures can also be used for the measurement principle, so that the invention provides an instrument of microscopic spatial resolution for the extreme UV. Since the working distance of such a microscope may be in the region of 1 cm, an examination of an object through a pressure-maintaining window of a vacuum chamber is thus also possible. The long working distance thus makes it possible to examine for example living substances or also vacuum-sensitive substances in the extreme UV at the Abbe limit. This is a measurement technique which is not currently available or which is available only in individual cases at very high cost.

D) The invention can also be used for greater distances, wherein in this case the existing competing systems are for example LIDAR systems. Compared to the present LIDAR systems, the use of the invention has the advantage that the spatial resolution is no longer defined by the size of the laser spot and that the technique is in principle a multichannel technique. Each pixel on the detector of the structure according to the invention corresponds to one channel. Conventional LIDAR systems are single-channel systems. This is associated with a long data acquisition time, which can be considerably reduced by using the invention.

At the same time, the resolution can be increased and a spectral analysis can take place if necessary. The quality of LIDAR measurements should be considerably increased by using this approach.

E) The device is also suitable for detecting and analysing broadband spectral light (EM radiation), for example luminescence. Compared to conventional telescope systems, it is to be expected that the system according to the invention, although having a lower light intensity, nevertheless has a greater resolution and is free of lens defects. The simple design of the system according to the invention, for example using D-shaped mirrors or diffractive elements, allows the simple and inexpensive construction of large and light-weight apertures. This should also be of interest to satellite applications for example.

The present invention will now be explained in greater detail on the basis of individual examples and figures. These examples and figures serve only to illustrate the general inventive concept, without the examples and figures being intended to limit the invention in any way.

BRIEF DESCRIPTION OF THE DRAWINGS

FIG. 1a shows a schematic diagram of one embodiment of an interferometer according to the invention.

FIG. 1b illustrates at a superposition point the combining of the perpendicular wave vector components of light beams which do not come from the central image point.

FIGS. 2, 3 and 6 to 8 show schematic diagrams of embodiments according to different embodiments of the present invention.

DETAILED DESCRIPTION OF EMBODIMENTS

Figure 2:
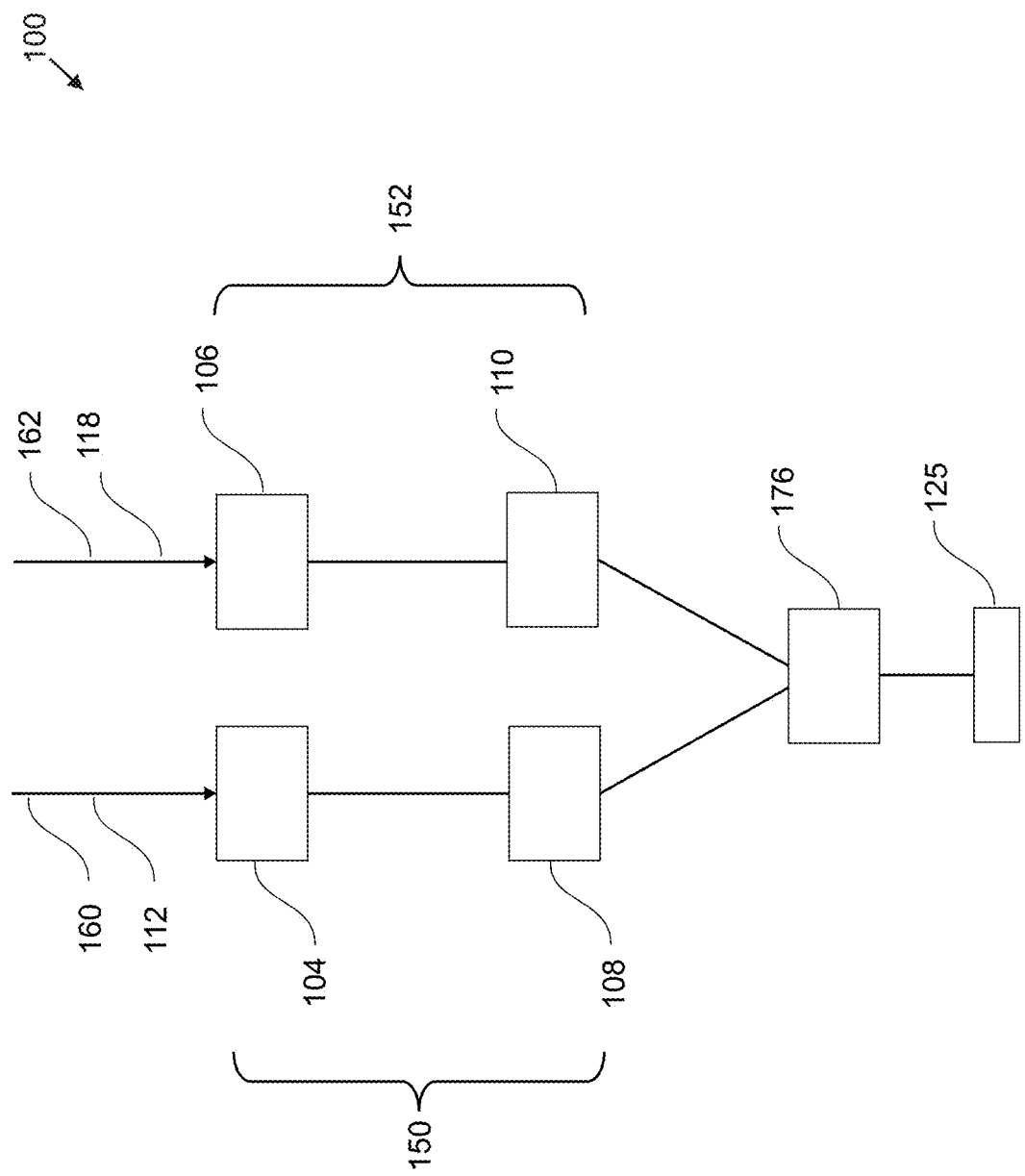

FIG. 1a shows a schematic diagram of one embodiment of an interferometer 100 according to the invention. An object 156 to be imaged is being measured interferometrically here. For the system to be imaged, the object 156 to be imaged consists of a large number of image points 158, of which only one is shown by way of example in FIG. 1a. Coming from each image point 158 are two light beams, a first light beam 160 and a second light beam 162, which pass through two interferometer arms, the first interferometer arm 150 and the second interferometer arm 152, and are superimposed behind the two interferometer arms 150, 152 at a superposition point 157, where an interference pattern is detected. The object 156 to be imaged also has a central image point 154 which emits two central beams, the first central beam 112 and the second central beam 118, which respectively run through the first interferometer arm 150 and the second interferometer arm 152 and are superimposed at the superposition point 157. The first central beam 112 or the first light beam 160 and the second central beam 118 or the second light beam 162 can be superimposed or overlapped in various ways after passing through the two interferometer arms 150, 152. This can be brought about for example by way of a mirror 159 and a semi-transparent mirror 161. The first central beam 112 or the first light beam 160, after passing through the first interferometer arm 150, impinges on the mirror 159 and is deflected by the latter preferably in a perpendicular direction. The second central beam 118 or the second light beam 162, after passing through the second interferometer arm 152, impinges on the semi-transparent mirror 161, by which one portion is reflected preferably in a perpendicular direction and another portion passes through the semi-transparent mirror 161 and is lost. The mirror 159 and the semi-transparent mirror 161 can thus be adjusted or oriented in such a way that the first central beam 112 or the first light beam 160, after reflection by the mirror 159, passes through the semi-transparent mirror 161 in such a way that, behind the semi-transparent mirror 161, the directions of propagation of the first central beam 112 or of the first light beam 160 on the one hand and of the second central beam 118 or of the second light beam 162 on the other hand substantially coincide. As already discussed above, behind the semi-transparent mirror 161, the directions of propagation of the first central beam 112 and of the second central beam 118 fully coincide. As has also already been discussed above, for the first light beam 160 and the second light beam 162 a wave vector component 164 of the first light beam 160, which is perpendicular to the first central beam 112, and a wave vector component 166 of the second light beam 162, which is perpendicular to the second central beam 108, are equal but in opposite directions, as illustrated in FIG. 1b. For reasons of clarity, only the central beams 112, 118 are shown in FIG. 1a, whereas the first light beam 160 and the second light beam 162 are shown in FIG. 1b. Shown in FIG. 1b is a plane at the superposition point 157, which runs perpendicular to the direction of propagation of the first central beam 112 and/or the second central beam 118. The wave vectors $k_{par,1}$ and $k_{par,2}$ can as be selected for example two basis vectors of said plane, which are perpendicular to one another. The wave vector $k_{par,1}$ may lie for example in the plane of the drawing in FIG. 1a. The wave vector component 164 of the first light beam 160, which is perpendicular to the first central beam 112, then has for example, as shown in FIG. 1b, one component parallel to $k_{par,1}$ and another component parallel to $k_{par,2}$. Compared to the wave vector component 164, the wave vector component 166 of the second light beam 162, which is perpendicular to the second central beam 118, has the same components $k_{par,1}$ and $k_{par,2}$, apart from the sign. The wave vector components 164 and 166 are therefore equal in value but antiparallel.

The central image point 154 is characterized in that the two central beams 112, 118 coming from the central image point 154 have at the superposition point 157 no perpendicular wave vector components and generate a $k_{perpendicular}=0$ interference.

In a device provided in practice, this central image point 154 can be determined after manufacture of the device, by varying the image point until the interference at the superposition point 157 has a $k_{perpendicular}=0$ interference. This method has proven itself under laboratory conditions.

FIG. 2 shows a schematic diagram of an interferometer 100 according to the invention. Light coming from an object 156 to be imaged (not shown) is brought to interference via a first interferometer arm 150 and a second interferometer arm 152. In the embodiment of FIG. 2, the first interferometer arm 150 has the first beam deflecting element 104 and the third beam deflecting element 108, and the second interferometer arm 152 has the second beam deflecting element 106 and the fourth beam deflecting element 110.

The first central beam 112 or the first light beam 160 runs through the first interferometer arm 150, and the second central beam 118 or the second light beam 162 runs through the second interferometer arm 152. Since the object 156 to be imaged is not necessarily at an infinite distance, the first central beam 112 and the second central beam 118 are not necessarily parallel to one another. This also applies to the first light beam 160 and the second light beam 162.

The light coming from each individual image point 158 or the central image point 154 of the object 156 to be imaged propagates in the form of spherical waves in the direction of the interferometer 100. Different wavefronts of the same spherical wave impinge on the one hand on the first beam deflecting element 104 of the first interferometer arm 150 and on the other hand on the second beam deflecting element 106 of the second interferometer arm 152. This separation of the wavefronts of a single light source, in particular of the spherical wave, is also known as "division of wavefront" in the technical jargon.

The first interferometer arm 150 and the second interferometer arm 152 are combined via a beam combining device 176. If the coherence condition is satisfied, the light combined by the beam combining device 176 has interferences which can be detected on a detector 125 that is arranged behind the beam combining device 176.

Various embodiments of a beam combining device 176 are shown in FIG. 5, as described below.

The embodiment of the present invention in FIG. 3 differs from the embodiment of FIG. 2 only by a beam splitter 172 which is arranged between the object 156 to be imaged (not shown) on the one hand and the first beam deflecting element 104 and the second beam deflecting element 106 on the other hand. The beam splitter 172 splits the light coming from the object 156 to be imaged into two light beams. The first of the split light beams runs as the first central beam 112 or as the first light beam 160 to the first beam deflecting element 104, and the second split light beam runs as the second central beam 118 or as the second light beam 162 to the second beam deflecting element 106.

The light wave impinging on the beam splitter 172 is split at the beam splitter 172 into two light waves of identical phase but with different amplitudes. The two split amplitudes may be different, but may also for example be equal. This splitting of the amplitudes of a single light source is also known as "division of amplitude" in the technical jargon.

Various embodiments of beam splitters 172 are shown in FIG. 4.

Figure 4C:
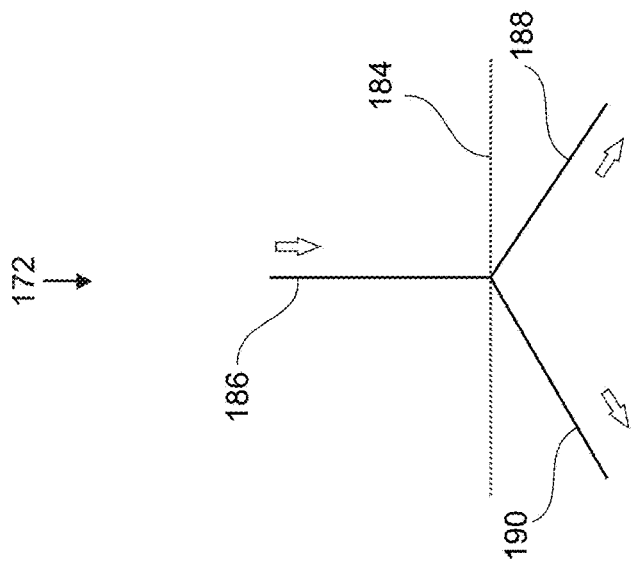
FIGS. 4 and 5 show different embodiments of beam splitters and beam combining devices, as can be seen in FIGS. 2 and 3 respectively.
Figure 4B:
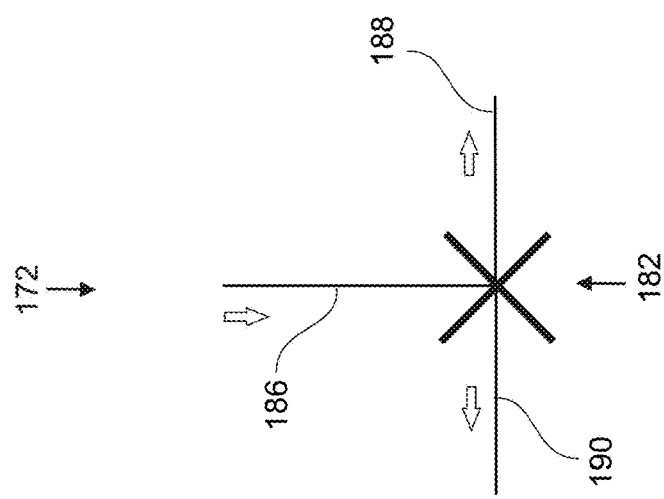
Figure 4A:
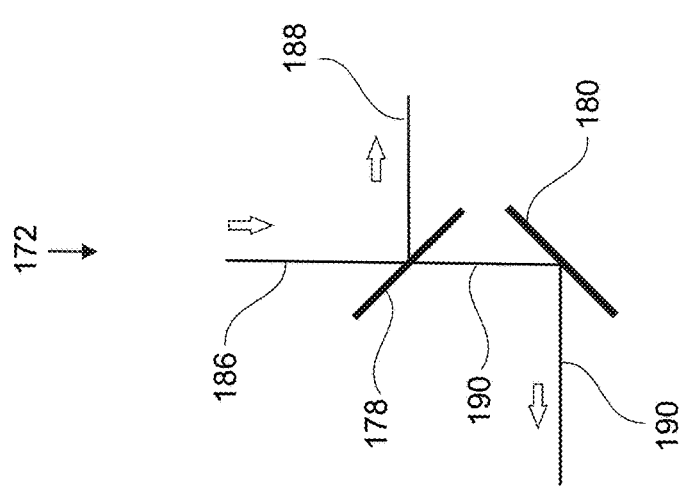

In FIG. 4a, the beam splitter 172 is formed as a combination of a beam splitter 178 and a mirror 180.

An incident light beam 186 impinges on the beam splitter 178 in the indicated arrow direction and is split there into the first exiting light beam 188 and the second exiting light beam 190. The second exiting light beam 190 may optionally be deflected in another direction at the mirror 180. The directions of the first exiting light beam 188 and of the second exiting light beam 190 need not be at right angles to the incident light beam 186, but rather can vary within a certain range. An angle between the incident light beam 186 and the first exiting light beam 188 or the second exiting light beam 190 may be for example between 20° and 160°.

In FIG. 4b, the beam splitter 172 is formed by a combined beam splitter 182. The combined beam splitter 182 consists of two semi-transparent mirrors which are arranged in a crossed fashion relative to one another and moreover penetrate one another. A light beam 186 incident on the combined beam splitter 182 is thus split into a first exiting light beam 188 and a second exiting light beam 190. Furthermore, there are losses due to back-reflections and light which passes through the semi-transparent mirror of the combined beam splitter 182 in the direction of the incident light beam 186.

In FIG. 4c, the beam splitter 172 is formed by a diffraction grating 184. The light beam 186 incident on the diffraction grating 184 is reflected in a plurality of diffraction orders. Modern diffraction gratings can be manufactured in such a way that the light is diffracted mainly in the first and the negative-first order, and the zero order (not shown) is substantially suppressed. The first exiting light beam 188 can thus represent the first diffraction order, and the second exiting light beam 190 can represent the negative-first diffraction order. This may of course also be the other way round. The angle between the incident light beam 186 and the diffraction orders depends, inter alia, on the grating constants of the diffraction grating used and on the wavelength of the light used.

FIG. 5 shows various embodiments of beam combining devices 176.

Figure 5C:
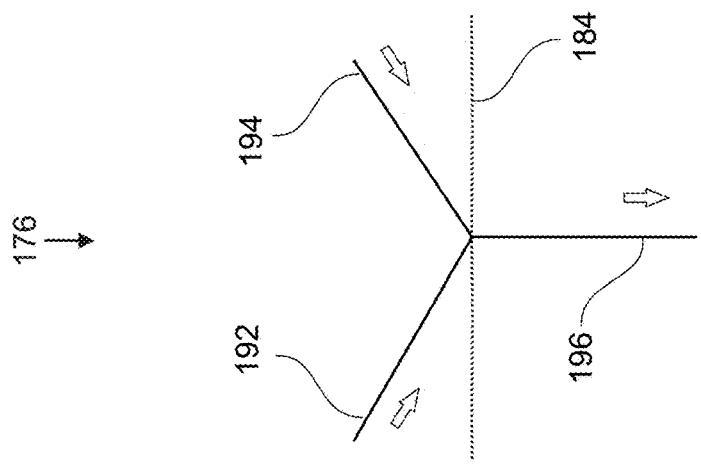
Figure 5B:
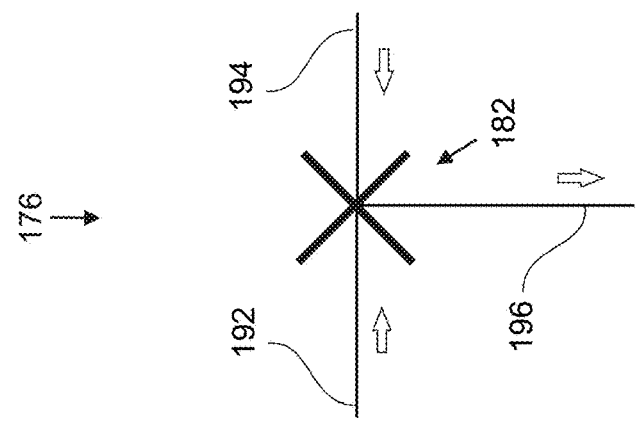
Figure 5A:
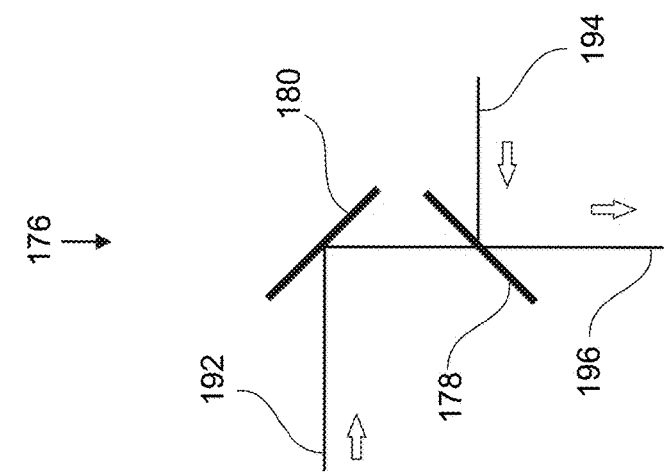

In FIG. 5a, the beam combining device 176 is formed as a combination of a mirror 180 and a beam splitter 178. A first incident light beam 192 is deflected by a mirror 180 on one side of a beam splitter 178, and the second incident beam 194 is deflected on the other side of the beam splitter 178. By virtue of the beam splitter 178, the first incident beam 192 and the second incident light beam 194 are brought together or combined in order to form an exiting light beam 196. In this case, the directions of the first incident beam 192 and of the second incident light beam 194 relative to the orientation of the beam splitter 178 must be selected in such a way that the direction of propagation of the reflected second incident light beam 194 is parallel to the direction of propagation of the first incident beam 192 that is reflected by the mirror 180, since only then are the two beams superimposed. Furthermore, there are losses at the beam splitter 178 due to light which passes through the beam splitter 178 from the second incident light beam 194 and is thus lost.

In FIG. 5b, the beam combining device 176 is formed by a combined beam splitter 182. The combined beam splitter 182 consists of two semi-transparent mirrors which are arranged in a crossed fashion relative to one another and which moreover penetrate one another. By virtue of the two semi-transparent mirrors, the first incident beam 192 and the second incident light beam 194 are brought together or combined in order to form an exiting light beam 196. In this case, there are also light losses due to back-reflections and reflections counter to the direction of the exiting light beam 196.

In FIG. 5c, the beam combining device 176 is formed by a diffraction grating 184. This corresponds to a reversal of the beam splitter 178 of FIG. 4c. Therefore, the first incident light beam 192 and the second incident light beam 194 correspond to the first and negative-first diffraction order of the grating. The exiting light beam 196 of FIG. 5c corresponds to the incident light beam 186 of FIG. 4c. In this case, there are also light losses due to diffraction in other orders, but these are not shown for reasons of clarity.

FIG. 6 shows an embodiment of an interferometer 100 according to the invention. The embodiment of FIG. 6 embodies the principle of "division of wavefront". In FIG. 6, the first central beam 112 and the second central beam 118, which are both emitted from the central image point 154 (not shown), run along the negative z axis and respectively impinge on the first beam deflecting element 104 and the second beam deflecting element 106. The first central beam 112 is deflected by the first beam deflecting element 104 in the direction of the x axis, and the second central beam 118 is deflected by the second beam deflecting element 106 in the direction of the negative x axis.

In the present case, the first central beam 112 and the second central beam 118 are each shown parallel to the z axis. This means that the object 156 to be imaged is at an infinite distance. However, the present invention also functions in principle with objects 156 to be imaged which are at a finite distance from the interferometer 100. In this case, the first central beam 112 and the second central beam 118 would not be parallel to one another.

The first central beam 112 is then deflected in the direction of the y axis by the third beam deflecting element 108, which is located at the origin of the coordinate system selected here, whereupon the first central beam 112 impinges on a detector 125 having a detection plane 126. In the present exemplary embodiment, the detector 125 has a two-dimensional arrangement or array of CMOS sensors.

After having been deflected in the direction of the negative x axis by the second beam deflecting element 106, the second central beam 118 is deflected in the direction of the y axis by the fourth beam deflecting element 110, in the same way as the first central beam 112. Since the third beam deflecting element 108 is configured as a semi-transparent mirror, the first central beam 112 and the second central beam 118 can thus be superimposed behind the third beam deflecting element 108, as seen in the direction coming from the fourth beam deflecting element 110. The superposition point 157 is thus located on the third beam deflecting element 108 or on the half-line behind the third beam deflecting element 108 at any position on the y axis. As described above, a $k_{perpendicular}=0$ interference between the first central beam 112 and the second central beam 118 can be detected at the superposition point 157.

Like the first central beam 112 and the second central beam 118, a first light beam 160 and a second light beam 162 are deflected via multiple reflections onto the detector 125. However, the direction of propagation of the first light beam 160 and of the second light beam 162 does not coincide with the direction of propagation of the first central beam 112 and of the second central beam 118.

If, compared to the direction of propagation of the first central beam 112 and of the second central beam 118, the direction of propagation of the first light beam 160 and of the second light beam 162 deviates away from the negative z axis along the xy plane, this leads after the reflections at the beam deflecting elements to the situation whereby the first light beam 160 propagates substantially along the y axis, but also has a small component along the xz axis, and the second light beam 162 likewise propagates substantially along the y axis, and likewise has a small component along the xz axis, but in exactly the opposite direction to the corresponding component of the first light beam 160. It can thus be said that the perpendicular wave vector component of the first light beam 160 at the superposition point 157 is equal but in an opposite direction to the corresponding perpendicular wave vector component of the second light beam 162. This can be verified in the present case by simple post-calculation. The present embodiment of FIG. 6 is therefore concrete evidence that a device exists which has the property shown for example in FIG. 1, namely that any deviation, in a plane perpendicular to the direction of propagation, of a light beam incident on an interferometer leads to the light in the two split interferometer arms having equal but opposite perpendicular components. For reasons of clarity, the small deviations between the first light beam 160 or the second light beam 162 from the first central beam 112 or the second central beam 118 are not shown.

Figure 7:
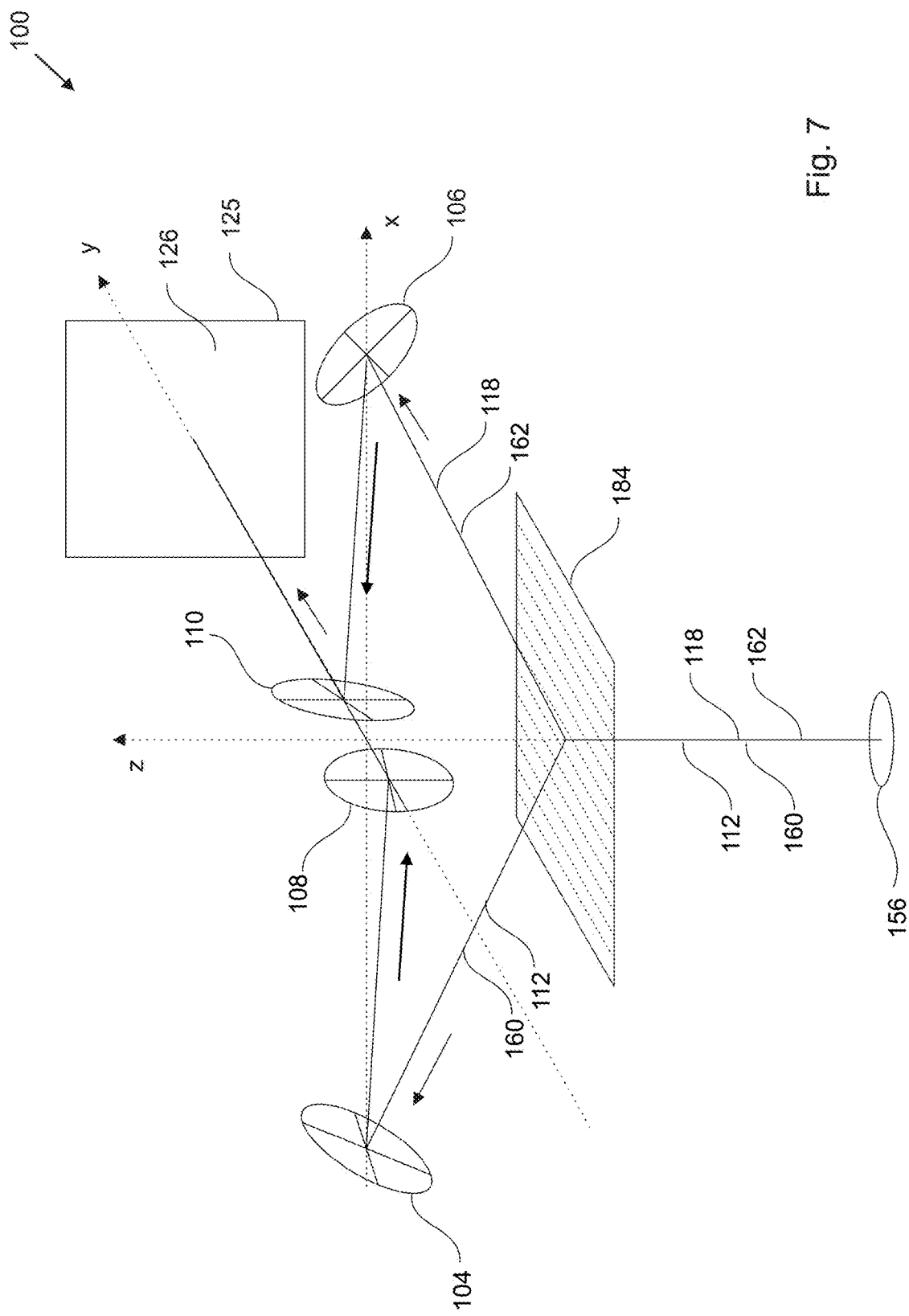

FIG. 7 shows a further embodiment of an interferometer 100 according to the invention. In contrast to the embodiment of FIG. 6, the principle of "division of amplitude" is shown in this embodiment. The light coming from the object 156 to be imaged is diffracted by the diffraction grating 184 into a first and a negative-first diffraction order. The light diffracted in the first diffraction order then impinges on the first beam deflecting element 104, and the light diffracted in the negative-first diffraction order impinges on the second beam deflecting element 106.

Between the object 156 to be imaged and the diffraction grating 184, the first central beam 112 and the second central beam 118 coincide. After the diffraction grating 184, the first central beam 112, after the reflection at the first beam deflecting element 104 and a further reflection at the third beam deflecting element 108, passes through the fourth beam deflecting element 110, which is configured as a semi-transparent mirror, and finally impinges on the detector 125 having the detection plane 126. After the diffraction grating 184, the second central beam 118, after reflection at the second beam deflecting element 106 and a further reflection at the fourth beam deflecting element 110, impinges on the detector 125. The fourth beam deflecting element 110, which is configured as a semi-transparent mirror, is used to superimpose the first central beam 112 and the second central beam 118. Since the fourth beam deflecting element 110 is configured as a semi-transparent mirror, unavoidable losses occur in both arms. The first light beam 160 runs in the same way as the first central beam 112, but has small deviations in comparison thereto. The second light beam 162 runs in the same way as the second central beam 118, but has small deviations in comparison thereto. This embodiment allows a particularly lightweight and compact construction of the interferometer according to the invention.

Figure 8:
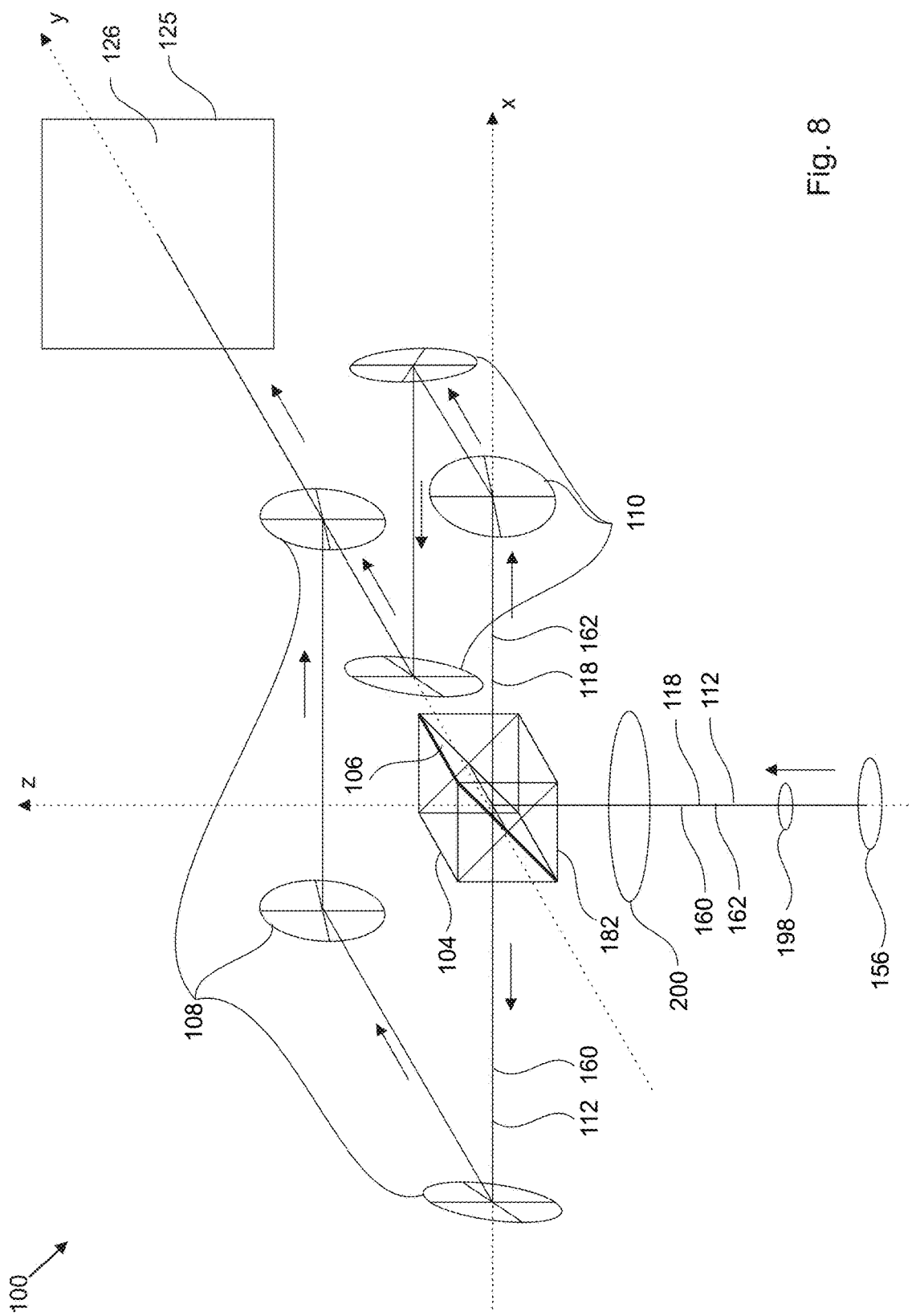

FIG. 8 shows a further embodiment of an interferometer 100 according to the invention, which can be used for example as a beam expander or microscope. For the sake of simplicity, only the central beams of the system will be described. The first central beam 112 coming from the object 156 to be imaged, and the second central beam 118 coinciding therewith, are expanded by a beam expander. The beam expander of the embodiment of FIG. 8 comprises, inter alia, a lens 198 and a lens 200 of greater focal length arranged therebehind. However, other beam expanders known in the prior art can also be used. The light beam thus expanded then impinges on a combined beam splitter 182, which combines the first beam deflecting element 104 and the second beam deflecting element 106. The light deflected in the negative x direction by the combined beam splitter 182 comprises inter alia the first central beam 112, and the light deflected in the x direction by the combined beam splitter 182 comprises inter alia the second central beam 118. After the combined beam splitter 182, the first central beam 112 impinges on three further mirrors, which together are denoted as the third beam deflecting element 108. After the combined beam splitter 182, the second central beam 118 impinges on three further mirrors, which together are denoted as the fourth beam deflecting element 110. In each case the last mirror of the third beam deflecting element 108 and of the fourth beam deflecting element 110 are used to superimpose the first central beam 112 and the second central beam 118. The superposition of the first central beam 112 and of the second central beam 118 finally impinges on the detector 125, where the interferogram of the first central beam 112 and of the second central beam 118 can be detected. The first light beam 160 and the second light beam 162 in this embodiment run analogously to what is shown in FIG. 7.

Figure 9B:
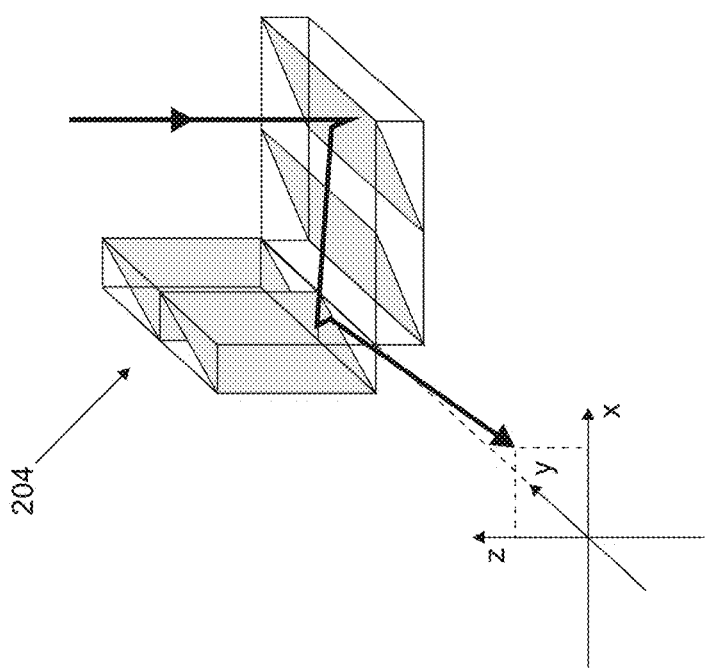
FIG. 9 shows an experimentally created embodiment of an interferometer according to the invention.
Figure 9A:
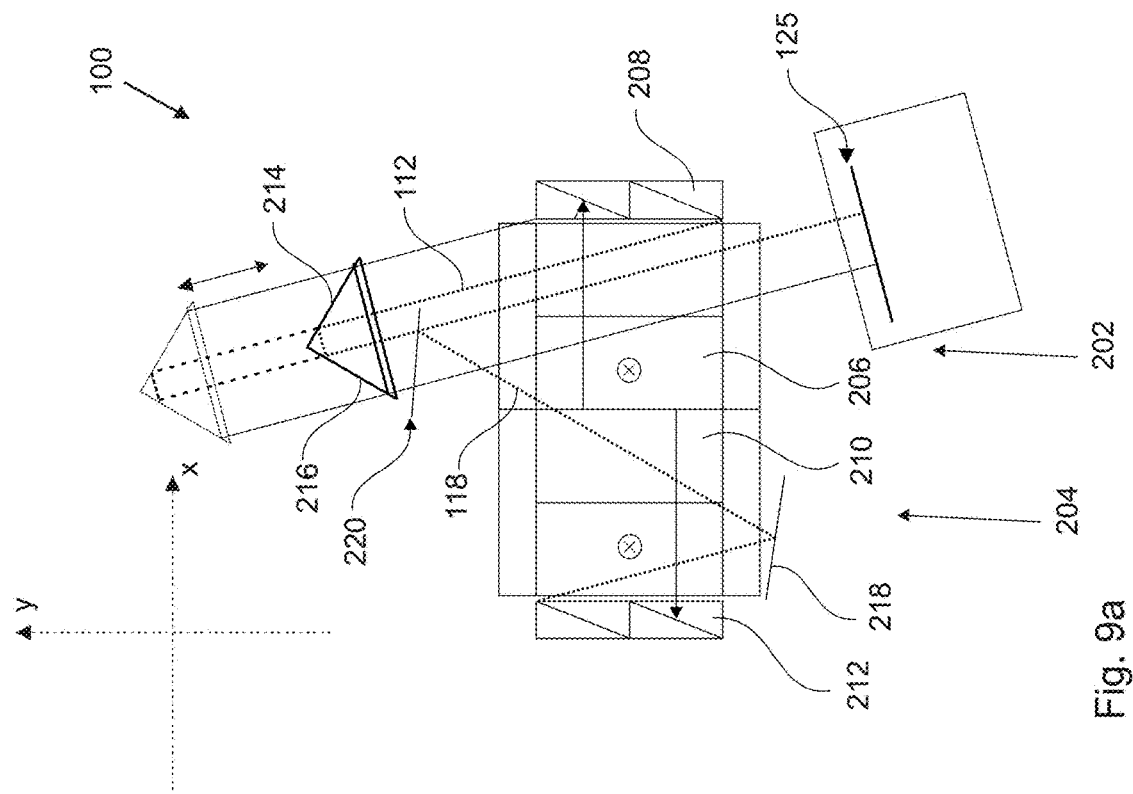

FIG. 9a shows a further embodiment of an interferometer 100 according to the invention, which has already been created in a similar form as a prototype in the laboratory. FIG. 9b illustrates the three-dimensional arrangement and construction of part of the interferometer 100 according to the invention.

Light from an object 156 to be imaged (not shown) runs along the negative z axis and then impinges on two arrangements of crossed D-shaped mirrors. The z axis is perpendicular to the plane of the drawing and forms a right system or right-hand system with the illustrated x- and y-axes. A first arrangement 202 of two D-shaped mirrors comprises a first D-shaped mirror 206 and a second D-shaped mirror 208. Furthermore, a second arrangement 204 of two D-shaped mirrors comprises a third D-shaped mirror 210 and a fourth D-shaped mirror 212.

The second arrangement 204 of two D-shaped mirrors is shown three-dimensionally in FIG. 9b. The second arrangement 204 of two D-shaped mirrors comprises the third D-shaped mirror 210 and the fourth D-shaped mirror 212.

The third D-shaped mirror 210 comprises: a dielectric medium having a flat light incidence surface and a refractive index greater than 1.3, and two mirror elements arranged downstream of the light incidence surface for deflecting the light beam into an exiting light beam, wherein the mirror elements, which are preferably rotatable, are each arranged adjacent to one another and lie in a plane parallel to the light incidence surface. Furthermore, the mirror elements each have a flat reflective surface and the dielectric medium completely fills the space between the reflective surfaces of the mirror elements and the light incidence surface. In addition, the mirror elements have a size greater than 0.1 mm. The remaining D-shaped mirrors 206, 208 and 212 are constructed in a manner identical to the third D-shaped mirror 210.

The two D-shaped mirrors of an arrangement of two D-shaped mirrors are perpendicular to one another. For example, for the arrangement 204 of two D-shaped mirrors shown in FIG. 9b, this means that a perpendicular standing on the light incidence surface of the third D-shaped mirror 210 forms an angle of 90° with a perpendicular standing on the light incidence surface of the fourth D-shaped mirror 212.

The first D-shaped mirror 206 and the second D-shaped mirror 208 are arranged in such a way that an incident light beam impinges firstly on the first D-shaped mirror 206 and then is deflected by the first D-shaped mirror 206 onto the second D-shaped mirror 208.

The third D-shaped mirror 210 and the fourth D-shaped mirror 212 are arranged in such a way that an incident light beam impinges firstly on the third D-shaped mirror 210 and then is deflected by the third D-shaped mirror 210 onto the fourth D-shaped mirror 212.

The light incidence surfaces of the first D-shaped mirror 206 and of the third D-shaped mirror 210 are parallel to the xy plane, and the light incidence surfaces of the second D-shaped mirror 208 and of the fourth D-shaped mirror 212 are parallel to the yz plane.

The perpendicular standing on the light incidence surface of the first D-shaped mirror 206 forms an angle of 90° with the perpendicular standing on the light incidence surface of the second D-shaped mirror 208.

The perpendicular standing on the light incidence surface of the third D-shaped mirror 210 forms an angle of 90° with the perpendicular standing on the light incidence surface of the fourth D-shaped mirror 212.

The perpendicular standing on the light incidence surface of the first D-shaped mirror 206 and the perpendicular standing on the light incidence surface of the third D-shaped mirror 210 are parallel and run along the z axis.

The perpendicular standing on the light incidence surface of the second D-shaped mirror 208 and the perpendicular standing on the light incidence surface of the fourth D-shaped mirror 212 are antiparallel, wherein the perpendicular standing on the light incidence surface of the second D-shaped mirror 208 runs along the negative x axis and the perpendicular standing on the light incidence surface of the fourth D-shaped mirror 212 runs along the x axis.

The upper edges of the light incidence surface of the first D-shaped mirror 206 and of the third D-shaped mirror 210 are substantially at the same height on the z axis as a lower edge of the second D-shaped mirror 208 and of the fourth D-shaped mirror 212.

The first D-shaped mirror 206, the second D-shaped mirror 208, the third D-shaped mirror 210 and the fourth D-shaped mirror 212 have a base area of 10 mm×10 mm.

The light impinging on the first arrangement 202 of two D-shaped mirrors or on the second arrangement 204 of two D-shaped mirrors from the object 156 to be imaged is in each case denoted in FIG. 9a by a circle containing a cross. This symbol means that the light beam in question runs into the plane of the drawing. This can be clearly seen in the three-dimensional diagram of FIG. 9b. Here, the light impinges via the entire surface of the first D-shaped mirror 206 and of the third D-shaped mirror 210.

The light impinging the first arrangement 202 of two D-shaped mirrors from the object 156 to be imaged impinges firstly on the first D-shaped mirror 206, is then deflected along the positive z axis and the positive x axis onto the second D-shaped mirror 208, in order then to impinge on two deflecting mirrors 214, 216 along the negative x axis and the positive x axis, and finally to be detected on the detector 125.

The light impinging on the second arrangement 204 of two D-shaped mirrors from the object 156 to be imaged impinges firstly on the third D-shaped mirror 210, is then deflected along the positive z axis and the negative x axis onto the fourth D-shaped mirror 212, in order then to impinge on a deflecting mirror 218 along the positive x axis and the negative y axis, in order to impinge from the latter onto the beam splitter 220 and to be deflected by the beam splitter 220 along the positive x axis and negative y axis, and finally to be detected on the detector 125. The first central beam 112 runs via the first arrangement 202 of two D-shaped mirrors and the deflecting mirrors 214, 216 to the detector 125, and the second central beam 118 runs via the second arrangement 204 of two D-shaped mirrors and the beam splitter 220 to the detector 125. The beam splitter 220 can preferably be displaced along the y axis, which can be brought about for example by means of a piezo element. The first light beam 160 and the second light beam 162 run substantially parallel to the first central beam 112 and to the second central beam 118.

For the embodiment of FIG. 9, the image reconstruction is particularly simple and can take place via an inverse Fourier transform.

LIST OF REFERENCES 100 interferometer
104 first beam deflecting element
106 second beam deflecting element
108 third beam deflecting element
110 fourth beam deflecting element
112 first central beam
118 second central beam
125 detector
126 detection plane
150 first interferometer arm
152 second interferometer arm
154 central image point
156 object to be imaged
157 superposition point
158 image point
159 mirror
160 first light beam
161 semi-transparent mirror
162 second light beam
164 wave vector component perpendicular to the first central beam
166 wave vector component perpendicular to the second central beam
172 beam splitter
176 beam combining device
178 beam splitter
180 mirror
182 combined beam splitter
184 diffraction grating
186 incident light beam
188 first exiting light beam
190 second exiting light beam
192 first incident light beam
194 second incident light beam
196 exiting light beam
198 lens
200 lens
202 arrangement of two D-shaped mirrors
204 arrangement of two D-shaped mirrors
206 first D-shaped mirror
208 second D-shaped mirror
210 third D-shaped mirror
212 fourth D-shaped mirror
214 deflecting mirror
216 deflecting mirror
218 deflecting mirror
220 beam splitter

The invention claimed is:

1. A three-dimensional interferometer, comprising:
a first interferometer arm including a first beam deflecting element; and
a second interferometer arm including a second beam deflecting element, the first interferometer arm further including a third beam deflecting element, the second interferometer arm further including a fourth beam deflecting element,
wherein the first interferometer arm and the second interferometer arm are arranged in such a way that
a first central beam, originating from a central image point of an object to be imaged, passes through the first interferometer arm,
a second central beam, originating from the central image point of the object to be imaged, passes through the second interferometer arm,
a first light beam, originating from an image point of the object to be imaged, passes through the first interferometer arm, and
a second light beam, originating from the image point of the object to be imaged, passes through the second interferometer arm,
the first, the second, the third, and the fourth beam deflecting elements are arranged in a three-dimensional manner such that
a direction of propagation of the first central beam in the first interferometer arm runs opposite or transversal to a direction of propagation of the second central beam in the second interferometer arm at least in places,
after passing through the first interferometer arm, a direction of propagation of the first light beam and the second light beam, deviates from the direction of propagation of the first central beam by a first deviation, and/or after passing through the second interferometer arm, a direction of propagation of the second light beam deviates from the direction of propagation of the second central beam by a second deviation,
after passing through the first or second interferometer arm, the first central beam and the second central beam are superimposed and generate a $k_{perpendicular}=0$ interference at a superposition point of the first central beam and the second central beam,
a $k_{perpendicular}=0$ interference is an interference of the first central beam and the second central beam in which the wave vectors of the first central beam and the second central beam run parallel,
after passing through the first and second interferometer arm, respectively, the first light beam and the second light beam overlap at the superposition point of the first central beam and the second central beam, and
at the superposition point, a wave vector component of the first light beam, which is perpendicular to the first central beam, and a wave vector component of the second light beam, which is perpendicular to the second central beam, are arranged in an opposing manner.

2. The interferometer according to claim 1, wherein the first, the second, the third, and the fourth beam deflecting elements are arranged such that, at the superposition point, a wave vector component of the first light beam, which is perpendicular to the first central beam, and a wave vector component of the second light beam, which is perpendicular to the second central beam, are equal but in opposite directions.

3. The interferometer according to claim 1, further comprising:
a detector, wherein the superposition point lies on a detection plane of the detector.

4. The interferometer according to claim 1, wherein the first, the second, the third, and the fourth beam deflecting elements are arranged such that
the first central beam and the first light beam impinge in the first interferometer arm on the first beam deflecting element and thereafter on the third beam deflecting element; and
the second central beam and the second light beam impinge in the second interferometer arm on the second beam deflecting element and thereafter on the fourth beam deflecting element.

5. The interferometer according to claim 4, wherein at least one of the first beam deflecting element, the third beam deflecting element, the second beam deflecting element, and the fourth beam deflecting element comprises a grating and/or at least one dielectric medium.

6. The interferometer according to claim 4, wherein
the first beam deflecting element is arranged in an arrangement plane which is spanned by the first beam deflecting element and a plane perpendicular to an optical axis, wherein the optical axis, starting from the central image point, is defined by the angle bisector between the first central beam and the second central beam,
the second beam deflecting element is arranged in such a way that the distance of the second beam deflecting element from the arrangement plane is smaller than the distance of the second beam deflecting element from the optical axis; and
the third beam deflecting element, the fourth beam deflecting element and the superposition point are arranged in such a way that the distance of the third beam deflecting element, of the fourth beam deflecting element and of the superposition point from the arrangement plane is in each case smaller than the distance of the third beam deflecting element from the optical axis.

7. The interferometer according to claim 4, wherein a first deflection transforms the first central beam prior to impingement on the first beam deflecting element into the first central beam after the impingement on the first beam deflecting element,
a second deflection transforms the second central beam prior to impingement on the second beam deflecting element into the second central beam after the impingement on the second beam deflecting element, and
a transformation of the first deflection into the second deflection is representable as a rotation of at least one of the first central beam or the second central beam through a rotation angle of between 150° and 210° about an axis of rotation and/or as a displacement of at least one of the first central beam or the second central beam along a displacement vector.

8. The interferometer according to claim 4, wherein the first beam deflecting element and the second beam deflecting element and/or the third beam deflecting element and the fourth beam deflecting element are contained in a single device.

9. The interferometer according to claim 4, wherein at least one beam combining device is arranged between the third and fourth beam deflecting elements and the superposition point.

10. The interferometer according to claim 4, wherein at least one of the first beam deflecting element, the third beam deflecting element, the second beam deflecting element and the fourth beam deflecting element comprises at least one D-shaped mirror.

11. The interferometer according to claim 10, wherein
the at least one D-shaped mirror comprises
a dielectric medium having a light incidence surface and a refractive index greater than 1.3, and
at least two mirror elements arranged downstream of the light incidence surface for deflecting the light beam into a light beam exiting from the at least one D-shaped mirror,
wherein the mirror elements are each arranged adjacent to one another, the mirror elements each have a flat reflective surface, the dielectric medium completely fills a space between the reflective surfaces of the mirror elements and the light incidence surface, and the mirror elements have a size greater than 0.1 mm.

12. The interferometer according to claim 1, wherein
the first beam deflecting element is arranged in an arrangement plane which is spanned by the first beam deflecting element and a plane perpendicular to an optical axis, wherein the optical axis, starting from the central image point, is defined by the angle bisector between the first central beam and the second central beam,
the second beam deflecting element is arranged in such a way that a connecting line between the point of impingement of the first central beam on the first beam deflecting element and the point of impingement of the second central beam on the second beam deflecting element and the arrangement plane enclose an angle less than or equal to 30°;
the third beam deflecting element is arranged in such a way that the first central beam between the first beam deflecting element and the third beam deflecting element and the arrangement plane enclose an angle less than or equal to 30°;
the fourth beam deflecting element is arranged in such a way that the second central beam between the second beam deflecting element and the fourth beam deflecting element and the arrangement plane enclose an angle less than or equal to 30°; and
the third beam deflecting element and the fourth beam deflecting element are arranged in such a way that the connecting line between the point of impingement of the first central beam on the third beam deflecting element and the superposition point and/or the connecting line between the point of impingement of the second central beam on the fourth beam deflecting element and the superposition point each enclose with the arrangement plane an angle less than or equal to 30°.

13. The interferometer according to claim 1, wherein at least one beam expander is arranged between the object and the first and second interferometer arms.

14. The interferometer according to claim 1, wherein at least one beam splitter is arranged between the object and the first and second interferometer arms.

15. The interferometer according to claim 1, wherein the interferometer is lensless.

16. A method for calibrating a device according to claim 1, in which the following steps are carried out for at least one optical path length difference between the first interferometer arm and the second interferometer arm and for at least one wavelength which is emitted by an object:
   creating a pixel raster for the object;
   creating a pixel raster for an image to be measured on a detector;
   successively generating a light-emitting pixel of the pixel raster of the object with a normal intensity, the remaining pixels being dark, for each individual pixel of the pixel raster of the object; and
   for each light-emitting pixel of the pixel raster of the object, detecting intensities of the pixel raster of the image to be measured on the detector.

17. A method for reconstructing an object from an image measured using an interferometer according to claim 1, in which the following steps are carried out for at least one optical path length difference between the first interferometer arm and the second interferometer arm and for at least one wavelength which is emitted by an object:
   detecting intensities of pixels of a pixel raster of the image measured using the interferometer; and
   calculating intensities of pixels of a pixel raster of the object on the basis of the detected intensities of the pixels of the pixel raster of the image measured using the interferometer.

* * * * *